US008586797B2

(12) United States Patent
Hawkins et al.

(10) Patent No.: US 8,586,797 B2
(45) Date of Patent: *Nov. 19, 2013

(54) PHOSPHONIUM IONIC LIQUIDS, COMPOSITIONS, METHODS OF MAKING AND DEVICES FORMED THERE FROM

(75) Inventors: J. Adrian Hawkins, Denver, CO (US); David A. Hudgins, Englewood, CO (US); Levi J. Irwin, Denver, CO (US)

(73) Assignee: eSionic ES, Inc., Menlo Park, CA (US)

( * ) Notice: Subject to any disclaimer, the term of this patent is extended or adjusted under 35 U.S.C. 154(b) by 534 days.

This patent is subject to a terminal disclaimer.

(21) Appl. No.: 12/501,913

(22) Filed: Jul. 13, 2009

(65) Prior Publication Data

US 2010/0006794 A1   Jan. 14, 2010

Related U.S. Application Data

(60) Provisional application No. 61/080,650, filed on Jul. 14, 2008.

(51) Int. Cl.
*C07F 9/02* (2006.01)
*H01G 9/22* (2013.01)

(52) U.S. Cl.
USPC .......................................... 568/9; 252/62.2

(58) Field of Classification Search
USPC ......................................................... 568/9
See application file for complete search history.

(56) References Cited

U.S. PATENT DOCUMENTS

| | | | |
|---|---|---|---|
| 3,036,132 A | 5/1962 | Becker | |
| 5,188,914 A | 2/1993 | Blomgren et al. | |
| 5,648,125 A | 7/1997 | Cane | |
| 5,827,602 A | 10/1998 | Koch | |
| 5,965,054 A | 10/1999 | Mcewen et al. | |
| 5,965,299 A | 10/1999 | Khan et al. | |
| 5,985,785 A | 11/1999 | Lane et al. | |
| 6,026,010 A | 2/2000 | Ema et al. | |
| 6,208,553 B1 | 3/2001 | Gryko et al. | |
| 6,212,093 B1 | 4/2001 | Lindsey | |
| 6,218,318 B1 | 4/2001 | Ohkura et al. | |
| 6,221,653 B1 | 4/2001 | Caren et al. | |
| 6,272,038 B1 | 8/2001 | Clausen et al. | |
| 6,284,317 B1 | 9/2001 | Laibinis et al. | |
| 6,324,091 B1 | 11/2001 | Gryko et al. | |
| 6,330,108 B1 | 12/2001 | Nishikouji et al. | |
| 6,365,301 B1 | 4/2002 | Michot et al. | |
| 6,381,169 B1 | 4/2002 | Bocian et al. | |
| 6,406,605 B1 | 6/2002 | Moles | |
| 6,440,560 B1 | 8/2002 | Gates et al. | |
| 6,451,942 B1 | 9/2002 | Li et al. | |
| 6,484,394 B1 | 11/2002 | Heo et al. | |
| 6,579,343 B2 | 6/2003 | Brennecke et al. | |
| 6,599,623 B2 | 7/2003 | Gates et al. | |
| 6,642,376 B2 | 11/2003 | Lindsey et al. | |
| 6,657,884 B2 | 12/2003 | Bocian et al. | |
| 6,674,121 B2 | 1/2004 | Misra et al. | |
| 6,728,129 B2 | 4/2004 | Lindsey et al. | |
| 6,737,107 B2 | 5/2004 | Gates et al. | |
| 6,777,516 B2 | 8/2004 | Li et al. | |
| 6,828,581 B2 | 12/2004 | Zangmeister et al. | |
| 6,855,950 B2 | 2/2005 | McCreery | |
| 6,891,248 B2 | 5/2005 | Akram et al. | |
| 6,900,382 B2 | 5/2005 | Chittibabu et al. | |
| 6,919,128 B2 | 7/2005 | McCreery | |
| 6,943,054 B2 | 9/2005 | Bocian et al. | |
| 7,005,237 B2 | 2/2006 | Lindsey | |
| 7,025,716 B1 | 4/2006 | Meloul et al. | |
| 7,026,051 B2 | 4/2006 | Schauer et al. | |
| 7,032,277 B2 | 4/2006 | Rolla et al. | |
| 7,061,791 B2 | 6/2006 | Bocian et al. | |
| 7,101,591 B2 | 9/2006 | Hayashi et al. | |
| 7,129,005 B2 | 10/2006 | Wensley et al. | |
| 7,136,275 B2 | 11/2006 | Koning et al. | |
| 7,141,299 B2 | 11/2006 | Mccreery | |
| 7,217,769 B2 | 5/2007 | Zamora et al. | |
| 7,223,628 B2 | 5/2007 | Bocian | |
| 7,307,870 B2 | 12/2007 | Kuhr et al. | |
| 7,324,385 B2 | 1/2008 | Mobley et al. | |
| 7,332,599 B2 | 2/2008 | Yu et al. | |

(Continued)

FOREIGN PATENT DOCUMENTS

WO    WO 01/03126 A2    1/2001
WO    WO 01/87900       11/2001

(Continued)

OTHER PUBLICATIONS

Chen, H., et al., "Phase Characterization and Properties of Completely Saturated Quaternary Phosphonium Salts. Ordered, Room-Temperature Ionic Liquids," Chemical Mater. 2002, 14, pp. 4063-4072.
Del Sesto, R., et al., "Tetraalkylphosphonium-based Ionic Liquids," Journal of Organometallic Chemistry, 690, 2005, pp. 2536-2542.
Duffy, N., et al., "Macroelectrode Voltammetry in Toluene Using a Phosphonium-Phosphate Ionic Liquid as the Supporting Electrolyte," Electrochemistry Communications, 8, (2006), pp. 892-898.
Ramirez, R., et al., "Electrochemical Aspects of Asymmetric Phosphonium Ionic Liquids," Journal of the Electrochemical Society, 154, (2), 2007 pp. B222-B233.

(Continued)

*Primary Examiner* — Sikarl Witherspoon
(74) *Attorney, Agent, or Firm* — Nixon Peabody LLP

(57) ABSTRACT

The invention generally encompasses phosphonium ionic liquids and compositions and their use in many applications, including but not limited to: as electrolytes in electronic devices such as memory devices including static, permanent and dynamic random access memory, as battery electrolytes, as a heat transfer medium, fuel cells and electrochromatic devices, among other applications. In particular, the invention generally relates to phosphonium ionic liquids, compositions and molecules possessing structural features, wherein the molecules exhibit superior combination of thermodynamic stability, low volatility, wide liquidus range and ionic conductivity. The invention further encompasses methods of making such phosphonium ionic liquids, compositions and molecules, and operational devices and systems comprising the same.

6 Claims, 18 Drawing Sheets

(56) References Cited

U.S. PATENT DOCUMENTS

| | | |
|---|---|---|
| 7,348,206 B2 | 3/2008 | Bocian et al. |
| 7,369,952 B2 | 5/2008 | Petrich et al. |
| 7,452,572 B1 | 11/2008 | Bocian et al. |
| 2002/0055045 A1 | 5/2002 | Michot et al. |
| 2002/0076714 A1 | 6/2002 | Kuhr et al. |
| 2002/0154535 A1 | 10/2002 | Bocian et al. |
| 2002/0180446 A1 | 12/2002 | Kuhr et al. |
| 2003/0082444 A1 | 5/2003 | Kuhr et al. |
| 2003/0092896 A1 | 5/2003 | Lindsey et al. |
| 2003/0109056 A1 | 6/2003 | Vossmeyer et al. |
| 2003/0111670 A1 | 6/2003 | Misra et al. |
| 2003/0169618 A1 | 9/2003 | Lindsey et al. |
| 2004/0106823 A1 | 6/2004 | Roberstson et al. |
| 2004/0115524 A1 | 6/2004 | Misra et al. |
| 2004/0120180 A1 | 6/2004 | Rotenberg et al. |
| 2004/0150465 A1 | 8/2004 | Nishida et al. |
| 2004/0190429 A1 | 9/2004 | McCreery |
| 2004/0191536 A1 | 9/2004 | Heimann et al. |
| 2004/0248428 A1 | 12/2004 | Bureau et al. |
| 2004/0254383 A1 | 12/2004 | Yu et al. |
| 2005/0039790 A1 | 2/2005 | Chittibabu et al. |
| 2005/0041494 A1 | 2/2005 | Bocian et al. |
| 2005/0048691 A1 | 3/2005 | Bocian et al. |
| 2005/0062097 A1 | 3/2005 | Misra et al. |
| 2005/0072462 A1 | 4/2005 | Kang et al. |
| 2005/0143517 A1 | 6/2005 | Schmidt |
| 2005/0162895 A1 | 7/2005 | Kuhr et al. |
| 2005/0175898 A1 | 8/2005 | Yong et al. |
| 2005/0181195 A1 | 8/2005 | Dubrow |
| 2005/0185447 A1 | 8/2005 | Kuhr et al. |
| 2005/0207208 A1 | 9/2005 | Bocian et al. |
| 2005/0243597 A1 | 11/2005 | Gallo et al. |
| 2005/0270820 A1 | 12/2005 | Mobley et al. |
| 2006/0081950 A1 | 4/2006 | Kuhr et al. |
| 2006/0092687 A1 | 5/2006 | Kuhr et al. |
| 2006/0103018 A1 | 5/2006 | Bureau et al. |
| 2006/0108320 A1 | 5/2006 | Lazovsky et al. |
| 2006/0141156 A1 | 6/2006 | Viel et al. |
| 2006/0195296 A1 | 8/2006 | Petrich et al. |
| 2006/0209587 A1 | 9/2006 | Bocian et al. |
| 2006/0210873 A1 | 9/2006 | Hollenkamp et al. |
| 2006/0211236 A1 | 9/2006 | Bureau et al. |
| 2006/0217568 A1* | 9/2006 | Ignatyev et al. .............. 558/54 |
| 2006/0223995 A1* | 10/2006 | Uchimura et al. ............. 544/59 |
| 2007/0000865 A1 | 1/2007 | Yoo et al. |
| 2007/0051459 A1 | 3/2007 | Yamano et al. |
| 2007/0066090 A1 | 3/2007 | Ono et al. |
| 2007/0108438 A1 | 5/2007 | Lindsey et al. |
| 2007/0123618 A1 | 5/2007 | Bocian et al. |
| 2007/0125422 A1 | 6/2007 | Hammami et al. |
| 2007/0148421 A1 | 6/2007 | Sohn et al. |
| 2007/0212615 A1 | 9/2007 | Jost et al. |
| 2008/0008930 A1 | 1/2008 | Matsumoto et al. |
| 2009/0225585 A1 | 9/2009 | Hawkins et al. |
| 2010/0003597 A1 | 1/2010 | Tsunashima et al. |
| 2010/0006797 A1 | 1/2010 | Hawkins et al. |
| 2010/0009255 A1 | 1/2010 | Hawkins et al. |
| 2010/0068604 A1 | 3/2010 | Hawkins et al. |
| 2010/0118598 A1 | 5/2010 | Hawkins et al. |

FOREIGN PATENT DOCUMENTS

| | | |
|---|---|---|
| WO | WO 2005/086826 | 9/2005 |
| WO | WO 2005/104288 | 11/2005 |
| WO | WO 2006/070545 | 7/2006 |
| WO | WO 2006/111712 A2 | 10/2006 |
| WO | WO 2008/032688 | 3/2008 |

OTHER PUBLICATIONS

Vaughan, J., et al., "Density, Viscosity and Conductivity of Tetra-alkyl Phosphonium Ionic Liquids," The University of British Columbia, Dept. of Materials Engineering, 12 pages, May 2006.
International Search Report and Written Opinion for PCT/US2009/50475 dated Sep. 8, 2009.
Arnold et al., "Mixed Phthalocyaninato-Porphyrinato Europium(III) Triple-decker Sandwich Complexes Containing a Conjugated Dimeric Porphyrin Ligand," Chemistry Letters, 1999, pp. 483-484.
Office Action in U.S. Appl. No. 12/501,946, mailed May 13, 2011.
Tsunashima, K. et al., "Physical and Electrochemical Properties of Low-Viscosity Phosphonium Ionic Liquids as Potential Electrolytes," Electrochemistry Communications, vol. 9, 2007, pp. 2353-2358.
Office Action in U.S. Appl. No. 12/501,946, mailed Jan. 27, 2012.
Office Action in U.S. Appl. No. 12/502,113, mailed Dec. 22, 2011.
Office Action in U.S. Appl. No. 12/502,152, mailed Jan. 20, 2012.
Connelly, N., et al., "Chemical Redox Agents for Organometallic Chemistry," Chem. Rev. 1996, 96, pp. 877-910.
Connelly, N., et al., "The Electron-Transfer Reactions of Mononuclear Organotransition Metal Complexes," Advances in Organometallic Chemistry vol. 23, pp. 1-93, (1984).
Gassman, P., et al., "(Trifluoromethyl) cyclopentadienide: A Powerful Electron-Withdrawing Ligand for Transition-Metal Complexes," J. Am. Chem. Soc. 108:1986, pp. 4228-4229.
Geiger, W., et al., "The Electron-Transfer Reactions of Polynuclear Organotransition Metal Complexes," Advances in Organometallic Chemistry vol. 24, pp. 87-130, (1985).
Jiang, J., et al., "Double-decker Yttrium (III) Complexes with Phthalocyaninato and Porphyrinato Ligands," J. Porphyrins Phthalocyanines, vol. 3, 1999, pp. 322-328.
Kuhr, W., et al., "Molecular Memories Based on a CMOS Platform," MRS Bulletin, Nov. 2004, 5 pages.
Li, F., et al., "Effects of Central Metal Ion (Mg, ZN) and Solvent on Singlet Excited-State Energy Flow in Porphyrin-Based Nanoctructures," J. Mater Chem., vol. 7: 1997, pp. 1245-1262.
Ng, D., et al., "Sandwich-type Heteroleptic Phthalocyaninato and Porphyrinato Metal Complexes," (1997) Chem. Society Reviews vol. 26, pp. 433-442.
Robbins, J. L., et al., "Syntheses and Electronic Structures of Decamethylmetallocenes," J. Am. Chem. Soc., vol. 104, 1982, pp. 1882-1893.
Roth, K., et al., "Molecular Approach Toward Information Storage Based on the Redox Properties of Porphyrins in Self-Assembled Monolayers," Vac. Sci. Technol. B 18, 2000, pp. 2359-2364.
Roth, K., et al., "Measurements of Electron-Transfer Rates of Charge-Storage Molecular Monolayers on Si (100), Toward Hybrid Molecular/Semiconductor Information Storage Devices," J. Am. Chem. Soc. 125, 2003, pp. 505-517.
Seth, J., et al., "Soluble Synthetic Multiporphyrin Arrays. 3. Static Spectroscopic and Electrochemical Probes of Electronic Communication," J. Am. Chem. Soc., 118, 1996, pp. 11194-11207.
Seth, J., et al., "Investigation of Electronic Communication in Multi-Porphyrin Light-harvesting Arrays," J. Am. Chem. Soc., 116, 1994, pp. 10578-10592.
Strachan, Jon-Paul, et al., "Synthesis and Characterization of Tetrachlorodiarylethyne-Linked Porphyrin Dimers. Effects of Linker Architecture on Intradimer Electronic Communication," Inorg. Chem. 37, 1998, pp. 1191-1201.
Strachan, Jon-Paul, et al., "Effects of Orbital Ordering on Electronic Communication Multiporphyrin Arrays," J. Am. Chem. Soc., 119, 1997, pp. 11191-11201.
Yang, S., et al., "Ground and Excited State Electronic Properties of Halogenated Tetraarylporphyrins. Tuning the Building Blocks for Porphyrin-Based Photonic Devices," J. Porphyrins Phthalocyanines, 3, 1999, pp. 117-147.
Yang, S., et al., "Interplay of Orbital Tuning and Linker Location in Controlling Electronic Communication in Porphyrin Arrays," J. Am. Chem. Soc., 121, 1999, pp. 4008-4018.
International Search Report and Written Opinion for PCT/US2008/88277 dated Apr. 29, 2009.
Office Action in U.S. Appl. No. 12/501,946, mailed Oct. 3, 2012.
Office Action in U.S. Appl. No. 12/502,078, mailed Aug. 29, 2012.
Notice of Allowance in U.S. Appl. No. 12/502,078, mailed Apr. 19, 2013.
Office Action in U.S. Appl. No. 12/502,113, mailed Jul. 23, 2012.
Office Action in U.S. Appl. No. 12/502,152, mailed Sep. 11, 2012.
Office Action in U.S. Appl. No. 12/502,152, mailed Apr. 4, 2013.
Office Action in Chinese Application No. 20980135853.3, mailed Jan. 14, 2013.
Office Action in U.S. Appl. No. 12/502,113, mailed Jun. 4, 2013.

* cited by examiner

Targeted Phospholium ILS

MeIm

N-methyl bis-(trifluoro-
methylsulfonyl) imide 1-ethyl-1-methylphospholium
bis-(trifluoromethyl sulfonyl) imide "ethyl phosphole"
1-ethyl phospha-
cyclopenta-2, 4-diene

US 8,586,797 B2

PHOSPHONIUM IONIC LIQUIDS, COMPOSITIONS, METHODS OF MAKING AND DEVICES FORMED THERE FROM

CROSS REFERENCE TO RELATED APPLICATIONS

This application claims the benefit of and priority to, U.S. Provisional Patent Application Ser. No. 61/080,650 filed on Jul. 14, 2008 entitled "Phosphonium Ionic Liquids, Compositions, Methods of Making and Devices Formed There From," the entire disclosure of which is incorporated by reference herein.

FIELD OF THE INVENTION

The invention generally encompasses phosphonium ionic liquids, compositions and their use in many applications, including but not limited to: as electrolytes in electronic devices such as memory devices including static, permanent and dynamic random access memory, as battery electrolytes, electrolytes in dye-sensitized solar cell, fuel cells (DSSCs), as a heat transfer medium, high temperature reaction and/or extraction media, among other applications. In particular, the invention relates to phosphonium ionic liquids, compositions and molecules possessing structural features, wherein the compositions exhibit desired combination of at least two or more of: thermodynamic stability, low volatility, wide liquidus range, and ionic conductivity. The invention further encompasses methods of making such phosphonium ionic liquids, compositions and molecules, and operational devices and systems comprising the same.

BACKGROUND OF THE INVENTION

Ionic liquids have received significant attention due in part to their wide potential use and application. The term "ionic liquid" is commonly used for salts whose melting point is relatively low (below 100° C.). Salts that are liquid at room temperature are commonly called room-temperature ionic liquids. Early investigators employed ionic liquids based on dialky-imidazolium salts. For example, Wilkes et. al developed ionic liquids based on dialkly-imidazolium salts for use with an aluminum metal anode and chlorine cathode in an attempt to create a battery. J. Wilkes, J. Levisky, R. Wilson, C. Hussey, *Inorg. Chem,* 21, 1263 (1982).

Some of the most widely studied and commonly used ionic liquids are based on pyridinium salts, with N-alklypyridinium and N,N'-dialylimidazolium finding significant use. Pyridinium based ionic liquids, including N-alkyl-pyridiums and N,N-dialkylimidazoliums, and nitrogen-based ionic liquids generally posses thermodynamic stabilities limited to 300° C., or less, are readily distillable, and tend to have measurable vapor pressures at temperatures significantly less than 200° C. Such properties limit their usefulness, as well as their applications. For example, such ionic liquids are susceptible to decomposition during back end of line (BEOL) thermal processing. Additionally, such ionic liquids are also decomposed during other heat-transfer processing steps which often subject the ionic liquids to continuous thermal cycling to temperatures exceeding 300° C.

The diverse nature of ionic liquids continues to be explored, and additional uses of ionic liquids have been considered. For example, electrochemical methods and applications are in need of electrolytes to enhance conductivity in a variety of devices and applications. Recent studies have been conducted in the area of room temperature ionic liquids as a possible alternative to conventional solvent based electrolytes.

While developments have been made, it is apparent that a continuing need exists for new developments in ionic liquid compositions and for materials and uses in which ionic liquids may be employed for use in polymer-gel electrolytes in lithium ion batteries, fuel cells, dye-sensitized solar cells and molecular capacitors.

SUMMARY OF THE INVENTION

The invention broadly encompasses phosphonium ionic liquids, compositions and their use in many applications, including but not limited to: as electrolytes in electronic devices such as memory devices including static, permanent and dynamic random access memory, dye-sensitized solar cells, fuel cells, as battery electrolytes, as a heat transfer medium, high temperature reactions and/or extraction media, among other applications. In particular, the invention relates to phosphonium ionic liquids, compositions and molecules possessing structural features, wherein the compositions exhibit desired combinations of at least two or more of: thermodynamic stability, low volatility, wide liquidus range and ionic conductivity.

In one aspect, an ionic liquid composition is provided, comprising: one or more phosphonium based cations of the general formula:

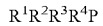
$R^1R^2R^3R^4P$ wherein: $R^1$, $R^2$, $R^3$ and $R^4$ are optional and each independently a substituent group; and one or more anions. In some embodiments $R^1$, $R^2$, $R^3$ and $R^4$ are each independently a different alkyl group comprised of 2 to 14 carbon atoms. In some embodiments, at least one of $R^1$, $R^2$, $R^3$ and $R^4$ is an aliphatic, heterocyclic moiety. Alternatively, at least one of $R^1$, $R^2$, $R^3$ and $R^4$ is an aromatic, heterocyclic moiety. In other embodiments, $R^1$ and $R^2$ are the same and are comprised of: tetramethylene phospholane, pentamethylele phosphorinane, tetramethinyl phosphole, phospholane or phosphorinane. In another embodiment, $R^2$, $R^3$ and $R^4$ are the same and are comprised of: phospholane, phosphorinane or phosphole.

In another embodiment, an ionic liquid composition is provided, comprising one or more phosphonium based cations, and one or more anions, wherein the ionic liquid composition exhibits onset temperatures greater than 400° C., thermodynamic stability greater than 375° C., a liquidus range greater than 400° C., and ionic conductivity up to 10 mS/cm at room temperature.

In another aspect, the invention encompasses ionic conducting electrolytes comprised of phosphonium based cations with suitable anions.

Further aspects of the invention provide a battery, comprising: a positive electrode, a negative electrode, a separator between said positive and negative electrode; and an electrolyte. The electrolyte is comprised of an ionic liquid composition, the ionic liquid composition comprising: one or more phosphonium based cations of the general formula:

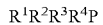
$R^1R^2R^3R^4P$ wherein: $R^1$, $R^2$, $R^3$ and $R^4$ are optional and each independently a substituent group; and one or more anions. In another embodiment, the electrolyte is characterized as an ionic liquid composition having one or more phosphonium based cations, and one or more anions, wherein the ionic liquid composition exhibits onset temperatures greater than 400° C., thermodynamic stability up to a temperature greater than 375° C., a liquidus range greater than 400° C., and ionic conductivity up to 10 mS/cm at room temperature.

Embodiments of the present invention further provide a heat transfer medium, comprising an ionic liquid composition comprising: one or more phosphonium based cations, and one or more anions, wherein the ionic liquid composition exhibits onset temperatures of greater than 400° C., thermodynamic stability up to a temperature of greater than 375° C., a liquidus range of greater than 400° C., and ionic conductivity up to 10 mS/cm.

The phosphonium ionic liquid compositions are useful in forming a variety of hybrid electrical devices. For example, in one embodiment a device is provided, comprising a first electrode, a second electrode; and an electrolyte comprised of an ionic liquid composition, the ionic liquid composition comprising: one or more phosphonium based cations of the general formula:

where $R^1$, $R^2$, $R^3$ and $R^4$ are optional and each independently a substituent group; and one or more anions, and wherein said electrolyte is electrically coupled to at least one of said first and second electrodes. In some embodiments the first electrode is comprised of redox active molecules (ReAMs).

In another embodiment a molecular storage device is provided, comprising a working electrode and a counter electrode configured to afford electrical capacitance; and an ion conducting composition comprising: one or more phosphine based cations of the general formula above and wherein the ion conducting composition is electrically coupled to at least the working and counter electrodes.

In another embodiment the invention encompasses a molecular memory element that includes a switching device, a bit line and a word line coupled to the switching device and a molecular storage device accessible through the switching device. The molecular storage device is capable of being placed in two or more discrete states, wherein the molecular storage device is placed in one of the discrete states by signals applied to the bit and word line. The molecular storage device comprises a first electrode, a second electrode and an electrolyte of phosphonium based cations and suitable anions between the first and second electrode.

Another embodiment encompasses molecular memory arrays comprising a plurality of molecular storage elements where each molecular storage element is capable of being placed in two or more discrete states. A plurality of bit lines and word lines are coupled to the plurality of molecular storage elements such that each molecular storage element is coupled to and addressable by at least one bit line and at least one word line.

BRIEF DESCRIPTION OF THE DRAWINGS

Other aspects, embodiments and advantages of the invention will become apparent upon reading of the detailed description of the invention and the appended claims provided below, and upon reference to the drawings in which:

DETAILED DESCRIPTION OF INVENTION

Overview

Figure 1:
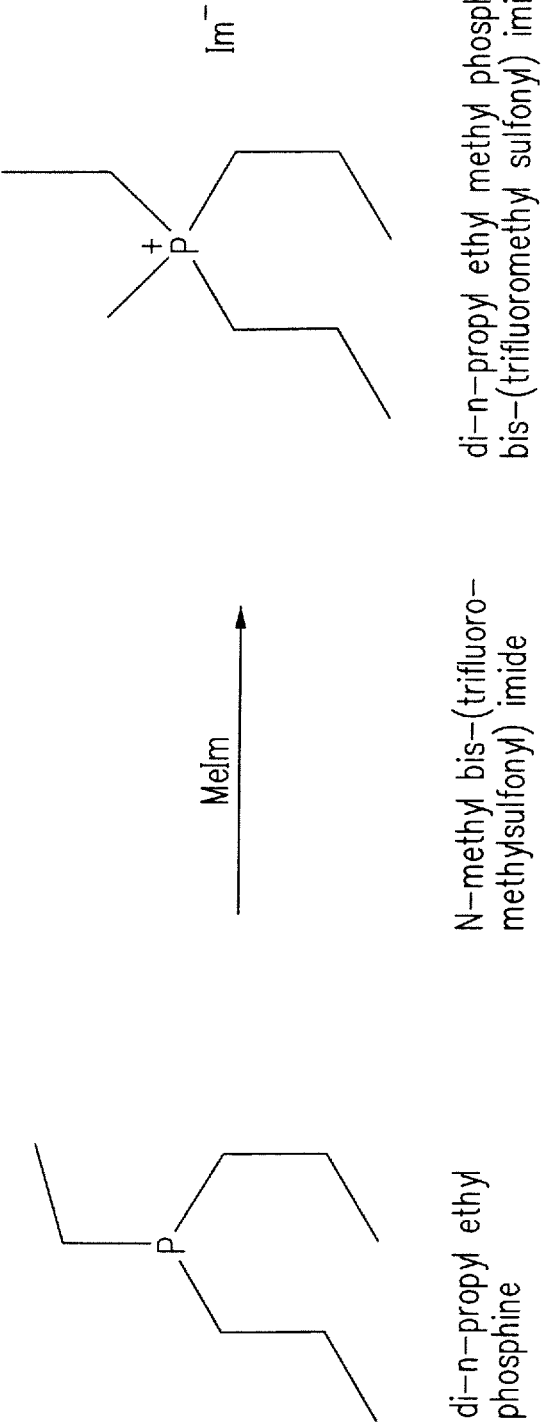
FIG. 1 depicts one reaction scheme to form a phosphonium ionic liquid according to some embodiments of the present invention.
Figure 2:
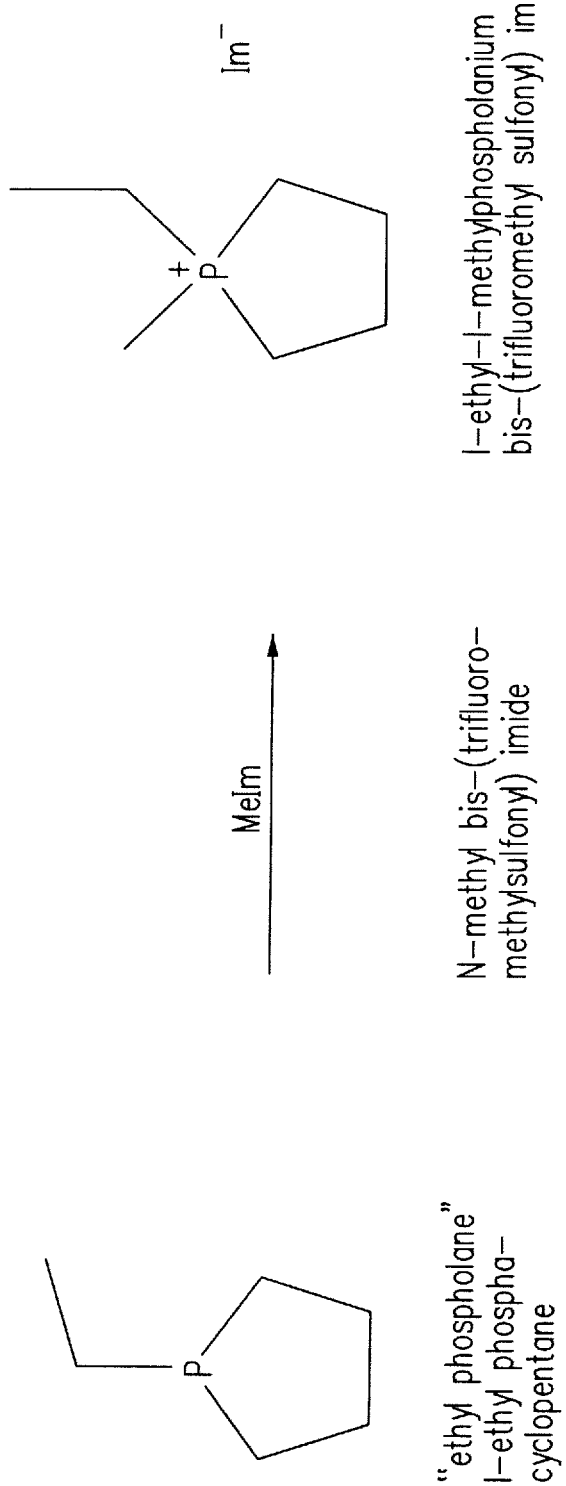
FIG. 2 depicts another reaction scheme to form other embodiments of a phosphonium ionic liquid of the present invention.
Figure 3:
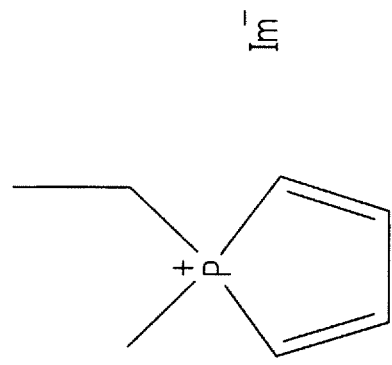
FIG. 3 depicts another reaction scheme to form a phosphonium ionic liquid according to other embodiments of the present invention.
Figure 3:
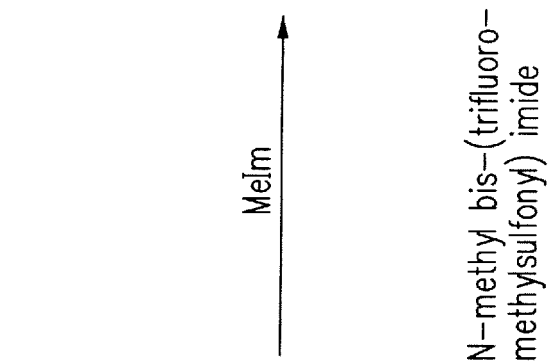
Figure 3:
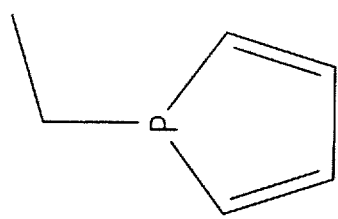
Figure 4:
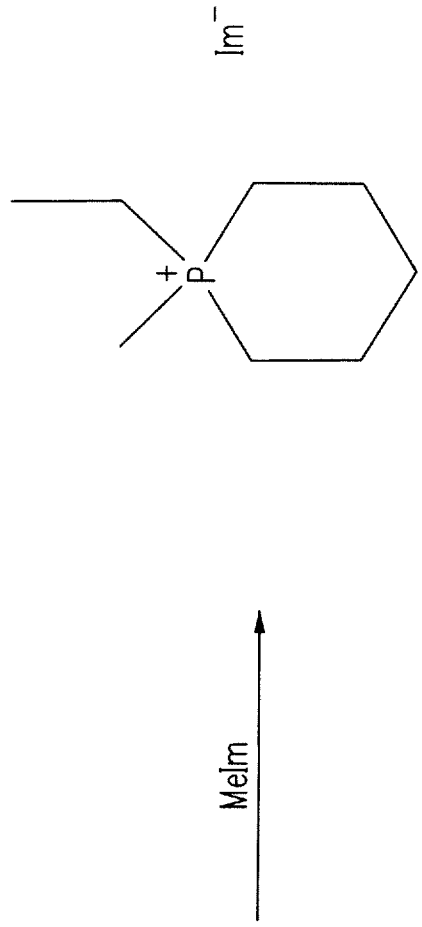
FIG. 4 depicts another reaction scheme to form a phosphonium ionic liquid according to further embodiments of the present invention.

The present invention is generally directed to phosphonium ionic liquids and compositions and their use in many applications.

General Description

The invention encompasses novel phosphonium ionic liquids, compositions and their use in many applications, including but not limited to: as electrolytes in electronic devices such as memory devices including static, permanent and dynamic random access memory, as an electrolyte in capacitors, batteries, fuel cells, and as electrochromatic (DSSC) devices. Additional applications include use as a heat transfer medium, high temperature reaction and/or extraction media, among other applications. In particular, the invention relates to phosphonium ionic liquids, compositions and molecules possessing structural features, wherein the composition exhibits desirable combination of at least two or more of: thermodynamic stability, low volatility, wide liquidus range, and ionic conductivity. The invention further encompasses methods of making such phosphonium ionic liquids, compositions and molecules, and operational devices and systems comprising the same.

In another aspect, embodiments of the present invention provide devices having an electrolyte comprised of phosphonium ionic liquid compositions. In another aspect, embodiments of the present invention provide a battery comprising an electrolyte composition comprised of phosphonium ionic liquid compositions.

The advantageous properties of the phosphonium ionic liquid compositions make them particularly suited for applications such as an electrolyte in capacitors, batteries, fuel cells, and as electrochromatic devices.

In a further aspect of the present invention, a heat transfer medium is provided comprised of phosphonium ionic liquid compositions. The advantageous properties of the compositions of the present invention are well suited as a heat transfer medium, and useful for use in processes and systems where a heat transfer medium is employed such as extraction media, reaction solvents, and electrochromatic devices (DSSCs).

Definitions

As used herein and unless otherwise indicated, the term "acyl" refers to an organic acid group in which the OH of the carboxyl group is replaced by some other substituent (RCO—), such as described herein as "R" substitutent groups. Examples include, but are not limited to, halo, acetyl and benzoyl.

As used herein and unless otherwise indicated, the term "alkoxy group" means an —O— alkyl group, wherein alkyl is as defined herein. An alkoxy group can be unsubstituted or substituted with one, two or three suitable substituents. Preferably, the alkyl chain of an alkoxy group is from 1 to 6 carbon atoms in length, referred to herein, for example, as "(C1-C6) alkoxy."

As used herein and unless otherwise indicated, "alkyl" by itself or as part of another substituent, refers to a saturated or unsaturated, branched, straight-chain or cyclic monovalent hydrocarbon radical derived by the removal of one hydrogen atom from a single carbon atom of a parent alkane, alkene or alkyne. Also included within the definition of an alkyl group are cycloalkyl groups such as C5, C6 or other rings, and heterocyclic rings with nitrogen, oxygen, sulfur or phosphorus (heterocycloalkyl). Alkyl also includes heteroalkyl, with heteroatoms of sulfur, oxygen, nitrogen, phosphorous, and silicon finding particular use in certain embodiments. Alkyl groups can be optionally substituted with R groups, independently selected at each position as described below.

Examples of alkyl groups include, but are not limited to, (C1-C6) alkyl groups, such as methyl, ethyl, propyl, isopropyl, 2-methyl-1-propyl, 2-methyl-2-propyl, 2-methyl-1-butyl, 3-methyl-1-butyl, 2-methyl-3-butyl, 2,2-dimethyl-1-propyl, 2-methyl-1-pentyl, 3-methyl-1-pentyl, 4-methyl-1-pentyl, 2-methyl-2-pentyl, 3-methyl-2-pentyl, 4-methyl-2-pentyl, 2,2-dimethyl-1-butyl, 3,3-dimethyl-1-butyl, 2-ethyl-1-butyl, butyl, isobutyl, t-butyl, pentyl, isopentyl, neopentyl, and hexyl, and longer alkyl groups, such as heptyl, and octyl.

The term "alkyl" is specifically intended to include groups having any degree or level of saturation, i.e., groups having exclusively carbon-carbon single bonds, groups having one or more carbon-carbon double bonds, groups having one or more carbon-carbon triple bonds and groups having mixtures of single, double and triple carbon-carbon bonds. Where a specific level of saturation is intended, the expressions "alkanyl," "alkenyl," and "alkynyl" are used.

"Alkanyl" by itself or as part of another substituent, refers to a saturated branched, straight-chain or cyclic alkyl radical derived by the removal of one hydrogen atom from a single carbon atom of a parent alkane. "Heteroalkanyl" is included as described above.

"Alkenyl" by itself or as part of another substituent, refers to an unsaturated branched, straight-chain or cyclic alkyl radical having at least one carbon-carbon double bond derived by the removal of one hydrogen atom from a single carbon atom of a parent alkene. The group may be in either the cis or trans conformation about the double bond(s). Suitable alkenyl groups include, but are not limited to (C2-C6) alkenyl groups, such as vinyl, allyl, butenyl, pentenyl, hexenyl, butadienyl, pentadienyl, hexadienyl, 2-ethylhexenyl, 2-propyl-2-butenyl, 4-(2-methyl-3-butene)-pentenyl. An alkenyl group can be unsubstituted or substituted with one or more independently selected R groups.

"Alkynyl" by itself or as part of another substituent, refers to an unsaturated branched, straight-chain or cyclic alkyl radical having at least one carbon-carbon triple bond derived by the removal of one hydrogen atom from a single carbon atom of a parent alkyne.

Also included within the definition of "alkyl" is "substituted alkyl". "Substituted" is usually designated herein as "R", and refers to a group in which one or more hydrogen atoms are independently replaced with the same or different substituent(s). R substituents can be independently selected from, but are not limited to, hydrogen, halogen, alkyl (including substituted alkyl (alkylthio, alkylamino, alkoxy, etc.), cycloalkyl, substituted cycloalkyl, cycloheteroalkyl, and substituted cycloheteroalkyl), aryl (including substituted aryl, heteroaryl or substituted heteroaryl), carbonyl, alcohol, amino, amido, nitro, ethers, esters, aldehydes, sulfonyl, sulfoxyl, carbamoyl, acyl, cyano, thiocyanato, silicon moieties, halogens, sulfur containing moieties, phosphorus containing moieties, etc. In some embodiments, as described herein, R substituents include redox active moieties (ReAMs). In some embodiments, optionally R and R' together with the atoms to which they are bonded form a cycloalkyl (including cycloheteroalkyl) and/or cycloaryl (including cycloheteroaryl), which can also be further substituted as desired. In the structures depicted herein, R is hydrogen when the position is unsubstituted. It should be noted that some positions may allow two or three substitution groups, R, R', and R", in which case the R, R', and R" groups may be either the same or different.

In some embodiments, the R groups (subunits) are used to adjust the redox potential(s) of the subject compound. Thus, as is more fully described below and in references cited herein, an R group such as a redox active subunit can be added to a macrocycle, particularly a porphyrinic macrocycle to alter its redox potential. Certain preferred substituents include, but are not limited to, 4-chlorophenyl, 3-acetamidophenyl, 2,4-dichloro-4-trifluoromethyl, and ferrocene (including ferrocene derivatives). When the substituents are used for altering redox potentials, preferred substituents provide a redox potential range of less than about 5 volts, preferably less than about 2 volts, more preferably less than about 1 volt.

In certain embodiments, the R groups are as defined and depicted in the figures and the text from U.S. Provisional Ser. No. 60/687,464 which is incorporated herein by reference. A number of suitable proligands and complexes, as well as suitable substituents, are outlined in U.S. Pat. Nos. 6,212,093; 6,728,129; 6,451,942; 6,777,516; 6,381,169; 6,208,553; 6,657,884; 6,272,038; 6,484,394; and U.S. Ser. Nos. 10/040, 059; 10/682,868; 10/445,977; 10/834,630; 10/135,220; 10/723,315; 10/456,321; 10/376,865; all of which are expressly incorporated by reference, in particular for the structures and descriptions thereof depicted therein, hereby expressly incorporated as substituent embodiments, both for the particular macrocycle the substituents are depicted within and for further substituted derivatives.

By "aryl" or grammatical equivalents herein is meant an aromatic monocyclic or polycyclic hydrocarbon moiety generally containing 5 to 14 carbon atoms (although larger polycyclic rings structures may be made) and any carbocyclic ketone, imine, or thioketone derivative thereof, wherein the carbon atom with the free valence is a member of an aromatic ring. Aromatic groups include arylene groups and aromatic groups with more than two atoms removed. For the purposes of this application aryl includes heteroaryl. "Heteroaryl" means an aromatic group wherein 1 to 5 of the indicated carbon atoms are replaced by a heteroatom chosen from nitrogen, oxygen, sulfur, phosphorus, boron and silicon wherein the atom with the free valence is a member of an aromatic ring, and any heterocyclic ketone and thioketone derivative thereof. Thus, heterocycle includes both single ring and multiple ring systems, e.g. thienyl, furyl, pyrrolyl, pyrimidinyl, indolyl, purinyl, quinolyl, isoquinolyl, thiazolyl, imidazolyl, naphthalene, phenanthroline, etc. Also included within the definition of aryl is substituted aryl, with one or more substitution groups "R" as defined herein and outlined above and herein. For example, "perfluoroaryl" is included and refers to an aryl group where every hydrogen atom is replaced with a fluorine atom. Also included is oxalyl.

As used herein the term "halogen" refers to one of the electronegative elements of group VIIA of the periodic table (fluorine, chlorine, bromine, iodine, astatine).

The term "nitro" refers to the $NO_2$ group.

By "amino groups" or grammatical equivalents herein is meant —NH2, —NHR and —NRR' groups, with R and R' independently being as defined herein.

As used herein the term "pyridyl" refers to an aryl group where one CH unit is replaced with a nitrogen atom.

As used herein the term "cyano" refers to the —CN group.

As used here the term "thiocyanato" refers to the —SCN group.

The term "sulfoxyl" refers to a group of composition RS(O)— where R is some substitution group as defined herein, including alkyl, (cycloalkyl, perfluoroalkyl, etc.), or aryl (e.g., perfluoroaryl group). Examples include, but are not limited to methylsulfoxyl, phenylsulfoxyl, etc.

The term "sulfonyl" refers to a group of composition RSO2—where R is a substituent group, as defined herein, with alkyl, aryl, (including cycloalkyl, perfluoroalkyl, or perfluoroaryl groups). Examples include, but are not limited to methylsulfonyl, phenylsulfonyl, p-toluenesulfonyl, etc.

The term "carbamoyl" refers to the group of composition R(R')NC(O)— where R and R' are as defined herein, examples include, but are not limited to N-ethylcarbamoyl, N,N-dimethylcarbamoyl, etc.

The term "amido" refers to the group of composition R.sup.1CON(R.sup.2)—where R.sup.1 and R.sup.2 are substituents as defined herein. Examples include, but are not limited to acetamido, N-ethylbenzamido, etc.

The term "acyl" refers to an organic acid group in which the OH of the carboxyl group is replaced by some other substituent (RCO—). Examples include, but are not limited to acetyl, benzoyl, etc.

The term "imine" refers to =NR.

In certain embodiments, when a metal is designated, e.g., by "M" or "$M_n$", where n is an integer, it is recognized that the metal can be associated with a counterion.

As used herein and unless otherwise indicated, the term "amperometric device" is a device capable of measuring the current produced in an electrochemical cell as a result of the application of a specific field potential ("voltage").

As used herein and unless otherwise indicated, the term "aryloxy group" means an —O— aryl group, wherein aryl is as defined herein. An aryloxy group can be unsubstituted or substituted with one or two suitable substituents. Preferably, the aryl ring of an aryloxy group is a monocyclic ring, wherein the ring comprises 6 carbon atoms, referred to herein as "(C6)aryloxy."

As used herein and unless otherwise indicated, the term "benzyl" means —CH2-phenyl.

As used herein and unless otherwise indicated, the term "carbonyl" group is a divalent group of the formula —C(O)—.

As used herein and unless otherwise indicated, the term "coulometric device" is a device capable of measuring the net charge produced during the application of a potential field ("voltage") to an electrochemical cell.

As used herein and unless otherwise indicated, the term "cyano" refers to the —CN group.

As used herein and unless otherwise indicated, the term "different and distinguishable" when referring to two or more oxidation states means that the net charge on the entity (atom, molecule, aggregate, subunit, etc.) can exist in two different states. The states are said to be "distinguishable" when the difference between the states is greater than thermal energy at room temperature (e.g., 0° C. to about 40° C.).

As used herein and unless otherwise indicated, the term "$E_{1/2}$" refers to the practical definition of the formal potential ($B_o$) of a redox process as defined by $B-B_o+(RT/nF)\ln(D_{ox}/D_{red})$ where R is the gas constant, T is temperature in K (Kelvin), n is the number of electrons involved in the process, F is the Faraday constant (96,485 Coulomb/mole), $D_{ox}$ is the diffusion coefficient of the oxidized species and $D_{red}$ is the diffusion coefficient of the reduced species.

As used herein and unless otherwise indicated, the term "electrically coupled" when used with reference to a storage molecule and/or storage medium and electrode refers to an association between that storage medium or molecule and the electrode such that electrons move from the storage medium/molecule to the electrode or from the electrode to the storage medium/molecule and thereby alter the oxidation state of the storage medium/molecule. Electrical coupling can include direct covalent linkage between the storage medium/molecule and the electrode, indirect covalent coupling (e.g. via a linker), direct or indirect ionic bonding between the storage medium/molecule and the electrode, or other bonding (e.g. hydrophobic bonding). In addition, no actual bonding may be required and the storage medium/molecule may simply be contacted with the electrode surface. There also need not necessarily be any contact between the electrode and the storage medium/molecule where the electrode is sufficiently close to the storage medium/molecule to permit electron tunneling between the medium/molecule and the electrode.

As used herein and unless otherwise indicated, the term "electrochemical cell" consists minimally of a reference electrode, a working electrode, a redox-active medium (e.g. a storage medium), and, if necessary, some means (e.g., a dielectric) for providing electrical conductivity between the electrodes and/or between the electrodes and the medium. In some embodiments, the dielectric is a component of the storage medium.

As used herein and unless otherwise indicated, the term "electrode" refers to any medium capable of transporting charge (e.g., electrons) to and/or from a storage molecule. Preferred electrodes are metals or conductive organic molecules. The electrodes can be manufactured to virtually any 2-dimensional or 3-dimensional shape (e.g., discrete lines, pads, planes, spheres, cylinders, etc.).

As used herein and unless otherwise indicated, the term "fixed electrode" is intended to reflect the fact that the electrode is essentially stable and unmovable with respect to the storage medium. That is, the electrode and storage medium are arranged in an essentially fixed geometric relationship with each other. It is of course recognized that the relationship alters somewhat due to expansion and contraction of the medium with thermal changes or due to changes in conformation of the molecules comprising the electrode and/or the storage medium. Nevertheless, the overall spatial arrangement remains essentially invariant.

As used herein and unless otherwise indicated, the term "linker" is a molecule used to couple two different molecules, two subunits of a molecule, or a molecule to a substrate.

As used herein and unless otherwise indicated, a metal is designated by "M" or "$M_n$," where n is an integer, it is recognized that the metal may be associated with a counter ion.

Many of the compounds described herein utilize substituents, generally depicted herein as "R." Suitable R groups include, but are not limited to, hydrogen, alkyl, alcohol, aryl, amino, amido, nitro, ethers, esters, aldehydes, sulfonyl, silicon moieties, halogens, cyano, acyl, sulfur containing moieties, phosphorus containing moieties, Sb, imido, carbamoyl, linkers, attachment moieties, ReAMs and other subunits. It should be noted that some positions may allow two substitution groups, R and R', in which case the R and R' groups may be either the same or different, and it is generally preferred that one of the substitution groups be hydrogen. In some embodiments, the R groups are as defined and depicted in the figures and the text from U.S.A. number of suitable proligands and complexes, as well as suitable substituents, are outlined in U.S. Pat. Nos. 6,212,093; 6,728,129; 6,451,942; 6,777,516; 6,381,169; 6,208,553; 6,657,884; 6,272,038; 6,484,394; and U.S. Ser. Nos. 10/040,059; 10/682,868; 10/445,977; 10/834,630; 10/135,220; 10/723,315; 10/456,321; 10/376,865; all of which are expressly incorporated by reference, in particular for the structures and descriptions thereof depicted therein, hereby expressly incorporated as substitutent embodiments, both for the particular macrocycle the substituents are depicted within and for further substituted derivatives.

As used herein and unless otherwise indicated, the term "sulfoxyl" refers to a group of composition RS(O)— where R is some alkyl, aryl, cycloalkyl, perfluoroalkyl, or perfluoroaryl group. Examples include, but are not limited to methylsulfoxyl, phenylsulfoxyl, etc.

As used herein and unless otherwise indicated, the term "sulfonyl" refers to a group of composition $RSO_2$, where R is some alkyl, aryl, cycloalkyl, perfluoroalkyl, or perfluoroaryl group. Examples include, but are not limited to methylsulfonyl, phenylsulfonyl, p-toluenesulfonyl, etc.

As used herein and unless otherwise indicated, the term "subunit" refers to a redox-active component of a molecule.

As used herein and unless otherwise indicated, the term "thiocyanato" refers to the —SCN group.

Phosphonium Ionic Liquids of the Invention

As described in detail herein, embodiments of novel phosphonium ionic liquid compositions of the present invention exhibit desirable properties and in particular a combination of at least two or more of: high thermodynamic stability, high ionic conductivity, wide liquidus range and low volatility. The combination of up to, and in some embodiments, all of these four properties at desirable levels in one composition was unexpected and not foreseen, and provides a significant advantage over known ionic liquid compositions. Embodiments of phosphonium ionic liquids of the present invention exhibiting such properties enable applications and devices not previously available.

In some embodiments, phosphonium ionic liquids of the present invention comprise phosphonium cations of selected molecular weights and substitution patterns, coupled with selected anion(s), to form ionic liquids with tunable combinations of thermodynamic stability, ionic conductively, liquidus range, and low volatility properties.

In some embodiments, by "ionic liquid" herein is meant a salt that is in the liquid state at and below 100° C. "Room temperature" ionic liquid is further defined herein in that it is in the liquid state at and below room temperature.

In some embodiments the present invention comprises phosphonium ionic liquids that exhibit thermodynamic stability up to temperatures of approximately 400° C., and more usually up to temperatures of approximately 375° C. Exhibiting thermal stability up to a temperature this high is a significant development, and allows use of the phosphonium ionic liquids of the present invention in a wide range of applications. Embodiments of phosphonium ionic liquids of the present invention further exhibit ionic conductivity up to or greater than 10 mS/cm at room temperature. Embodiments of phosphonium ionic liquids of the present invention exhibit volatilities that are <20% of those exhibited by their nitrogen-based analogs. This combination of high thermal stability, high ionic conductivity, wide liquidus range, and low volatility, is highly desirable and was unexpected. Generally, in the prior art ionic liquids it is found that thermal stability and ionic conductivity exhibit an inverse relationship. In other embodiments, the phosphonium ionic liquids exhibit thermodynamic stability at temperatures in the range of 20° C. to 375° C., and ionic conductivity of 0 mS/cm to 0.02 mS/cm. In further embodiments, the phosphonium ionic liquids exhibit thermodynamic stability at temperatures in the range of 0° C. to 300° C., and ionic conductivity of 0 mS/cm to 0.10 mS/cm.

In some embodiments, phosphonium ionic liquids are comprised of cations having molecular weight of up to 500 Daltons. In other embodiments, phosphonium ionic liquids are comprised of cations having molecular weight in the range of 200 to 500 Daltons for liquids at the lower thermal stability ranges.

Phosphonium ionic liquid compositions of the present invention are comprised of phosphonium based cations of the general formula:

$$R^1R^2R^3R^4P \qquad (1)$$

wherein:

$R^1$, $R^2$, $R^3$ and $R^4$ are optional and each independently a substituent group. In some embodiments, wherein the cations are comprises of open chains, the general formula further comprises $R^4$.

In some embodiments $R^1$, $R^2$, $R^3$ and $R^4$ are each independently an alkyl group. In one embodiment, at least one of the alkyl groups is different from the other two. In one embodiment none of the alkyl groups are methyl. In some embodiments, an alkyl group is comprised of 2 to 7 carbon atoms, more usually 1 to 6 carbon atoms. In some embodiments $R^1$, $R^2$, $R^3$ and $R^4$ are each independently a different alkyl group comprised of 2 to 14 carbon atoms. In some embodiments, the alkyl groups contain no branching. In one embodiment $R^1=R^2$ in an aliphatic, heterocyclic moiety. Alternatively, $R^1=R^2$ in an aromatic, heterocyclic moiety.

In some embodiments, $R^1$ or $R^2$ are comprised of phenyl or substituted alkylphenyl. In some embodiments, $R^1$ and $R^2$ are the same and are comprised of tetramethylene (phospholane) or pentamethylene (phosphorinane). Alternatively, $R^1$ and $R^2$ are the same and are comprised of tetramethinyl (phosphole). In a further embodiment, $R^1$ and $R^2$ are the same and are comprised of phospholane or phosphorinane. Additionally, in another embodiment $R^2$ $R^3$ and $R^4$ are the same and are comprised of phospholane, phosphorinane or phosphole.

In some embodiments at least one, more, of or all of $R^1$, $R^2$, $R^3$ and $R^4$ are selected such that each does not contain functional groups that would react with the redox molecules (REAM) described below. In some embodiments, at least one, more, of or all of $R^1$, $R^2$, $R^3$ and $R^4$ do not contain halides, metals or O, N, P, or Sb.

In some embodiments, the alkyl group comprises from 1 to 7 carbon atoms. In other embodiments the total carbon atoms from all alkyl groups is 12 or less. In yet other embodiments, the alkyl group are each independently comprised of 1 to 6 carbon atoms, more typically, from 1 to 5 carbon atoms.

In an exemplary embodiment, phosphonium cations are comprised of the following formula:

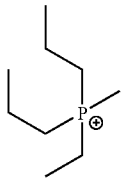

In another exemplary embodiment, phosphonium cations are comprised of the following formula:

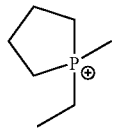

In yet another exemplary embodiment, phosphonium cations are comprised of the following formula:

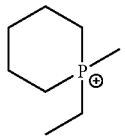

In an additional exemplary embodiment, phosphonium cations are comprised of the following formula:

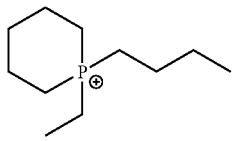

In a further exemplary embodiment, phosphonium cations are comprised of the following formula:

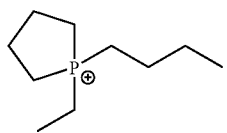

In an additional exemplary embodiment, phosphonium cations are comprised of the following formula:

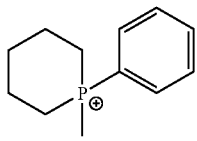

In an additional exemplary embodiment, phosphonium cations are comprised of the following formula:

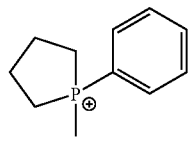

In another exemplary embodiment, phosphonium cations are comprised of the following formula:

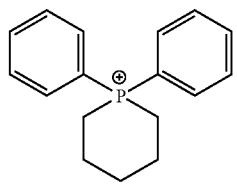 [SMILES: c1ccc([P+]2(c3ccccc3)CCCCC2)cc1]

In a further exemplary embodiment, phosphonium cations are comprised of the following formula:

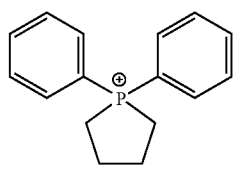 [SMILES: c1ccc([P+]2(c3ccccc3)CCCC2)cc1]

In yet another exemplary embodiment, phosphonium cations are comprised of the following formula:

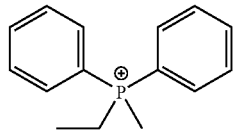 [SMILES: CC[P+](C)(c1ccccc1)c1ccccc1]

In still another exemplary embodiment, phosphonium cations are comprised of the following formula:

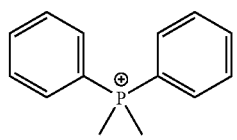

Another exemplary provides phosphonium cations comprised of the following formula:

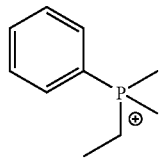

Further provided are phosphonium cations comprised of the following formula:

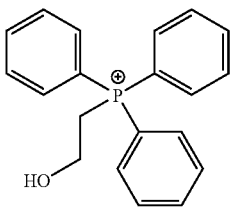

In some embodiments examples of suitable phosphine cations include but are not limited to: di-n-propyl ethyl phosphine; n-butyl n-propyl ethyl phoshpine; n-hexyl n-butyl ethyl phosphine; and the like.

In other embodiments, examples of suitable phosphine cations include but are not limited to: ethyl phospholane; n-propyl phospholane; n-butyl phospholane; n-hexyl phopholane; and phenyl phospholane.

In further embodiments, examples of suitable phosphine cations include but are not limited to: ethyl phosphole; n-propyl phosphole; n-butyl phosphole; n-hexyl phophole; and phenyl phosphole.

In yet another embodiment, examples of suitable phosphine cations include but are not limited to: 1-ethyl phosphacyclohexane; n-propyl phosphacyclohexane; n-butyl phosphacyclohexane; n-hexyl phophacyclohexane; and phenyl phosphacyclohexane.

Phosphonium ionic liquids of the present invention are comprised of cations and anions. As will be appreciated by those of skill in the art, there are a large variety of possible cation and anion combinations. Phosphonium ionic liquids of the present invention comprise cations as described above with anions that are generally selected from compounds that are easily ion exchanged with reagents or solvents of the general formula:

$M^+Im^-$

Wherein Im is bis-perfluoromethyl sulfonyl imide, M is a metal. In the instance of an organic solvent, M is preferably L, K, Na, $NH_4$ or Ag. In the instance of aqueous solvents, M is preferably Ag.

Many anions may be selected. In one preferred embodiment, the anion is [bis-perfluoromethyl sulfonyl imide].

Exemplary embodiments of suitable anions include, but are not limited to, any one or more of: $NO_3^-$, $O_3SCF_3^-$, $N(SO_2CF_3)_2^-$, $PF_6^-$, $O_3SC_6H_4CH_3^-$, $O_3SCF_2CF_2CF_3^-$, $O_3SCH_3^-$, $I^-$, $C(CN)_3^-$, $^-O_3SCF_3$, $^-N(SO_2)_2CF_3$, $CF_3BF_3^-$, $^-O_3SCF_2CF_2CF_3$, $SO_4^{2-}$, $^-O_2CCF_3$, $^-O_2CCF_2CF_2CF_3$ and dicyanamide (DCA). In another embodiment, phosphonium ionic liquids of the present invention are comprised of a single cation-anion pair. Alternatively, two or more phosphonium ionic liquids may be used to form common binaries, mixed binaries, common ternaries, mixed ternaries, and the like. Composition ranges for binaries, terneries, etc, include from 1 ppm, up to 999,999 ppm for each component cation and each component anion.

In one preferred embodiment, phosphonium ionic liquid compositions are comprised of cation and anion combinations as shown in Tables 1A and 1B, below. Table 1A illustrates examples of common (Cationic) Binaries:

TABLE 1A

| Cation Structure | Examples of Common (Cationic) Binaries |
|---|---|
|  | $1NO_3^-/1O_3SCF_3^-$<br>$3NO_3^-/1O_3SCF_3^-$<br>$1NO_3^-/3O_3SCF_3^-$<br>$1NO_3^-/1N(SO_2CF_3)_2^-$<br>$1NO_3^-/1PF_6^-$<br>$1O_3SCF_3^-/1N(SO_2CF_3)_2^-$<br>$1O_3SCF_3^-/1O_3SC_6H_4CH_3^-$<br>$3O_3SCF_3^-/1O_3SC_6H_4CH_3^-$<br>$1O_3SCF_3^-/1O_3SCF_2CF_2CF_3^-$<br>$1O_3SC_6H_4CH_3^-/3O_3SCH_3^-$<br>$1O_3SC_6H_4CH_3-/1O_3SCF_2CF_2CF_3-$<br>$3O_3SC_6H_4CH_3-/1O_3SCF_2CF_2CF_3-$<br>$1O_3SC_6H_4CH_3-/3O_3SCF_2CF_2CF_3-$ |

Table 1B illustrates examples of cation and anion combinations:

TABLE 1B

| Cation Structure | Anions |
|---|---|
|  | $I^-$<br>$-N(SO_2)_2CF_3$<br>$-O_3SCF_3$<br>$-O_2CCF_3$<br>$-O_2CCF_2CF_2CF_3$<br>$-O_3SC_6H_4CH_3$<br>$CF_3BF_3^-$<br>$C(CN)_3^-$<br>$PF_6^-$<br>$NO_3^-$<br>$-O_3SCH_3$<br>$-O_3SC_6H_4CHCH_2$<br>$BF_4^-$<br>$-O_3SCF_2CF_2CF_3$<br>$-SC(O)CH_3$<br>$SO_4^{2-}$<br>$-O_2CCF_2CF_3$<br>$-O_2CH$<br>$-O_2CC_6H_5$<br>$-OCN$<br>$CO_3^{2-}$ |

In another preferred embodiment, phosphonium ionic liquid compositions are comprised of cation and anion combinations as shown in Table 2 below:

TABLE 2

| Cation Structure | Anions |
|---|---|
|  | $I^-$<br>$C(CN)_3^-$<br>$-O_3SCF_3$<br>$-N(SO_2)_2CF_3$<br>$NO_3^-$<br>$CF_3BF_3^-$<br>$-O_3SCF_2CF_2CF_3$<br>$SO_4^{2-}$<br>$-N(CN)_2$ |

In another preferred embodiment, phosphonium ionic liquid compositions are comprised of cation and anion combinations as shown in Table 3 below:

TABLE 3

| Cation Structure | Anions |
|---|---|
| (phosphorinane with methyl and ethyl substituents, P⊕) | I⁻<br>—N(SO₂)₂CF₃<br>C(CN)₃⁻<br>—O₃SCF₂CF₂CF₃<br>NO₃⁻<br>—O₂CCF₃<br>—O₂CCF₂CF₂CF₃ |

In a further preferred embodiment, phosphonium ionic liquid compositions are comprised of the cation and anion combinations as shown in Table 4 below:

TABLE 4

| Cation Structure | Anions |
|---|---|
| (phosphorinane with butyl and ethyl substituents, P⊕) | I⁻<br>—N(SO₂)₂CF₃<br>—O₃SC₆H₄CH₃<br>—O₃SCF₂CF₂CF₃<br>—O₃SCF₃ |

In yet a further preferred embodiment, phosphonium ionic liquid compositions are comprised of the cation and anion combinations as shown in Table 5 below:

TABLE 5

| Cation Structure | Anions |
|---|---|
| (phospholane with butyl and ethyl substituents, P⊕) | I⁻<br>—N(SO₂)₂CF₃<br>—O₃SCF₃<br>—O₃SCF₂CF₂CF₃ |

In another preferred embodiment, phosphonium ionic liquid compositions are comprised of the cation and anion combinations as shown in Table 6 below:

TABLE 6

| Cation Structure | Anions |
|---|---|
| (phosphorinane with phenyl substituent, P⊕) | I⁻<br>—N(SO₂)₂CF₃<br>—O₃SCF₃<br>NO₃⁻<br>C(CN)₃⁻<br>PF₆⁻ |

In another preferred embodiment, phosphonium ionic liquid compositions are comprised of cation and anion combinations as shown in Table 7 below:

TABLE 7

| Cation Structure | Anions |
|---|---|
| (phospholane with phenyl and methyl substituents, P⊕) | I⁻<br>NO₃⁻<br>—N(SO₂)₂CF₃ |

In another preferred embodiment, phosphonium ionic liquid compositions are comprised of cation and anion combinations as shown in Table 8 below:

TABLE 8

| Cation Structure | Anions |
|---|---|
| (phosphorinane with two phenyl substituents, P⊕) | I⁻<br>—N(SO₂)₂CF₃ |

In another preferred embodiment, phosphonium ionic liquid compositions are comprised of cation and anion combinations as shown in Table 9 below:

TABLE 9

| Cation Structure | Anions |
|---|---|
| (phospholane with two phenyl substituents, P⊕) | I⁻<br>—N(SO₂)₂CF₃ |

In another preferred embodiment, phosphonium ionic liquid compositions are comprised of cation and anion combinations as shown in Table 10 below:

TABLE 10

| Cation Structure | Anions |
|---|---|
| (diphenyl phosphonium with ethyl and methyl substituents, P⊕) | I⁻<br>NO₃⁻<br>—N(SO₂)₂CF₃ |

Additional preferred embodiments include phosphonium ionic liquid compositions are comprised of cation and anion combinations as shown in Table 11 below:

TABLE 11

| Cation Structure | Anions |
|---|---|
| 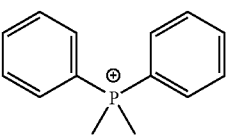 | I⁻<br>NO₃⁻<br>—N(SO₂)₂CF₃ |

Provided are further preferred embodiments of phosphonium ionic liquid compositions comprised of cation and anion combinations as shown in Table 12 below:

TABLE 12

| Cation Structure | Anions |
|---|---|
| 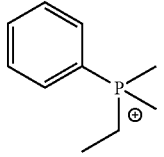 | I⁻<br>NO₃⁻<br>—N(SO₂)₂CF₃ |

Another preferred exemplary embodiment includes phosphonium ionic liquid compositions comprised of cation and anion combinations as shown in Table 13 below:

TABLE 13

| Cation Structure | Anions |
|---|---|
| 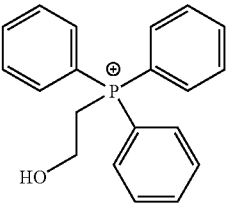 [SMILES: OCC[P+](c1ccccc1)(c1ccccc1)c1ccccc1] | Br—<br>—N(SO₂)₂CF₃<br>—O₃SCF₃<br>PF₆⁻<br>NO₃⁻ |

In some embodiments further examples of suitable phosphonium ionic liquid compositions include but are not limited to: di-n-propyl ethyl methyl phosphonium bis-(trifluoromethyl sulfonyl)imide; n-butyl n-propyl ethyl methyl phosphonium bis-(trifluoromethyl sulfonyl)imide; n-hexly n-butyl ethyl methyl phosphonium bis-(trifluoromethyl sulfonyl)imide; and the like.

Illustrative examples of suitable phosphonium ionic liquid compositions further include but are not limited to: 1-ethyl-1-methyl phospholanium bis-(trifluoromethyl sulfonyl)imide; n-propyl methyl phospholanium bis-(trifluoromethyl sulfonyl)imide; n-butyl methyl phospholanium bis-(trifluoromethyl sulfonyl)imide; n-hexyl methyl phopholanium bis-(trifluoromethyl sulfonyl)imide; and phenyl methyl phospholanium bis-(trifluoromethyl sulfonyl)imide.

In another embodiment, examples of suitable phosphonium ionic liquid compositions include but are not limited to: 1-ethyl-1-methyl phospholium bis-(trifluoromethyl sulfonyl)imide; n-propyl methyl phospholium bis-(trifluoromethyl sulfonyl)imide; n-butyl methyl phospholium bis-(trifluoromethyl sulfonyl imide; n-hexyl methyl phopholium bis-(trifluoromethyl sulfonyl)imide; and phenyl methyl phospholium bis-(trifluoromethyl sulfonyl) imide.

Further exemplary embodiments of suitable phosphonium ionic liquid compositions include but are not limited to: 1-ethyl-1-methyl phosphacyclohexane bis-(trifluoromethyl sulfonyl)imide; n-propyl methyl phosphacyclohexane bis-(trifluoromethyl sulfonyl)imide; n-butyl methyl phosphacyclohexane bis-(trifluoromethyl sulfonyl)imide; n-hexyl methyl phosphacyclohexane bis-(trifluoromethyl sulfonyl)imide; and phenyl methyl phosphacyclohexane bis-(trifluoromethyl sulfonyl)imide.

Phosphonium ionic liquids of the present invention may also form a eutectic from one or more solids, or from a solid and a liquid, according to some embodiments. In this instance, the term "ionic liquid" is further defined to include ionic liquid that are eutectics from ionic solids, or from an ionic liquid and an ionic solid, such as binaries, ternaries, and the like.

5.5 Redox-Active Molecules

Phosphorus ionic liquids of the present invention described herein can be employed to synthesize a wide range of hybrid components and/or devices, such as for example memory devices and elements. In an exemplary embodiment, phosphonium ionic liquids herein are used to form molecular memory devices where information is stored in a redox-active information storage molecule.

The term "redox-active molecule (ReAM)" herein is meant to refer to a molecule or component of a molecule that is capable of being oxidized or reduced, e.g., by the application of a suitable voltage. As described below, ReAMs can include, but are not limited to macrocycles including porphyrin and porphyrin derivatives, as well as non-macrocyclic compounds, and includes sandwich compounds, e.g. as described herein. In certain embodiments, ReAMs can comprise multiple subunits, for example, in the case of dyads or triads. ReAMs can include ferrocenes, Bipys, PAHs, viologens, and the like. In general, as described below, there are several types of ReAMs useful in the present invention, all based on polydentate proligands, including macrocyclic and non-macrocyclic moieties. A number of suitable proligands and complexes, as well as suitable substituents, are outlined in U.S. Pat. Nos. 6,212,093; 6,728,129; 6,451,942; 6,777,516; 6,381,169; 6,208,553; 6,657,884; 6,272,038; 6,484,394; and U.S. Ser. Nos. 10/040,059; 10/682,868; 10/445,977; 10/834,630; 10/135,220; 10/723,315; 10/456,321; 10/376,865; all of which are expressly incorporated by reference, in particular for the structures and descriptions thereof depicted therein.

Suitable proligands fall into two categories: ligands which use nitrogen, oxygen, sulfur, carbon or phosphorus atoms (depending on the metal ion) as the coordination atoms (generally referred to in the literature as sigma (σ) donors) and organometallic ligands such as metallocene ligands (generally referred to in the literature as pi (π) donors, and depicted herein as Lm).

In addition, a single ReAM may have two or more redox active. For example, FIG. 13A of U.S. Publication No. 2007/0108438 shows two redox active subunits, a porphurin (shown in the absence of a metal), and ferrocense. Similarly, sandwich coordination compounds are considered a single ReAM. This is to be distinguished from the case where these ReAMs are polymerized as monomers. In addition, the metal ions/complexes of the invention may be associated with a counterion, not generally depicted herein.

Macrocyclic Ligands

In one embodiment, the ReAM is a macrocyclic ligand, which includes both macrocyclic proligands and macrocyclic complexes. By "macrocyclic proligand" herein is meant a cyclic compound which contain donor atoms (sometimes referred to herein as "coordination atoms") oriented so that they can bind to a metal ion and which are large enough to encircle the metal atom. In general, the donor atoms are heteroatoms including, but not limited to, nitrogen, oxygen and sulfur, with the former being especially preferred. However, as will be appreciated by those in the art, different metal ions bind preferentially to different heteroatoms, and thus the heteroatoms used can depend on the desired metal ion. In addition, in some embodiments, a single macrocycle can contain heteroatoms of different types.

A "macrocyclic complex" is a macrocyclic proligand with at least one metal ion; in some embodiments the macrocyclic complex comprises a single metal ion, although as described below, polynucleate complexes, including polynucleate macrocyclic complexes, are also contemplated.

A wide variety of macrocyclic ligands find use in the present invention, including those that are electronically conjugated and those that may not be; however, the macrocyclic ligands of the invention preferably have at least one, and preferably two or more oxidation states, with 4, 6 and 8 oxidation states being of particular significance.

Figure 11:
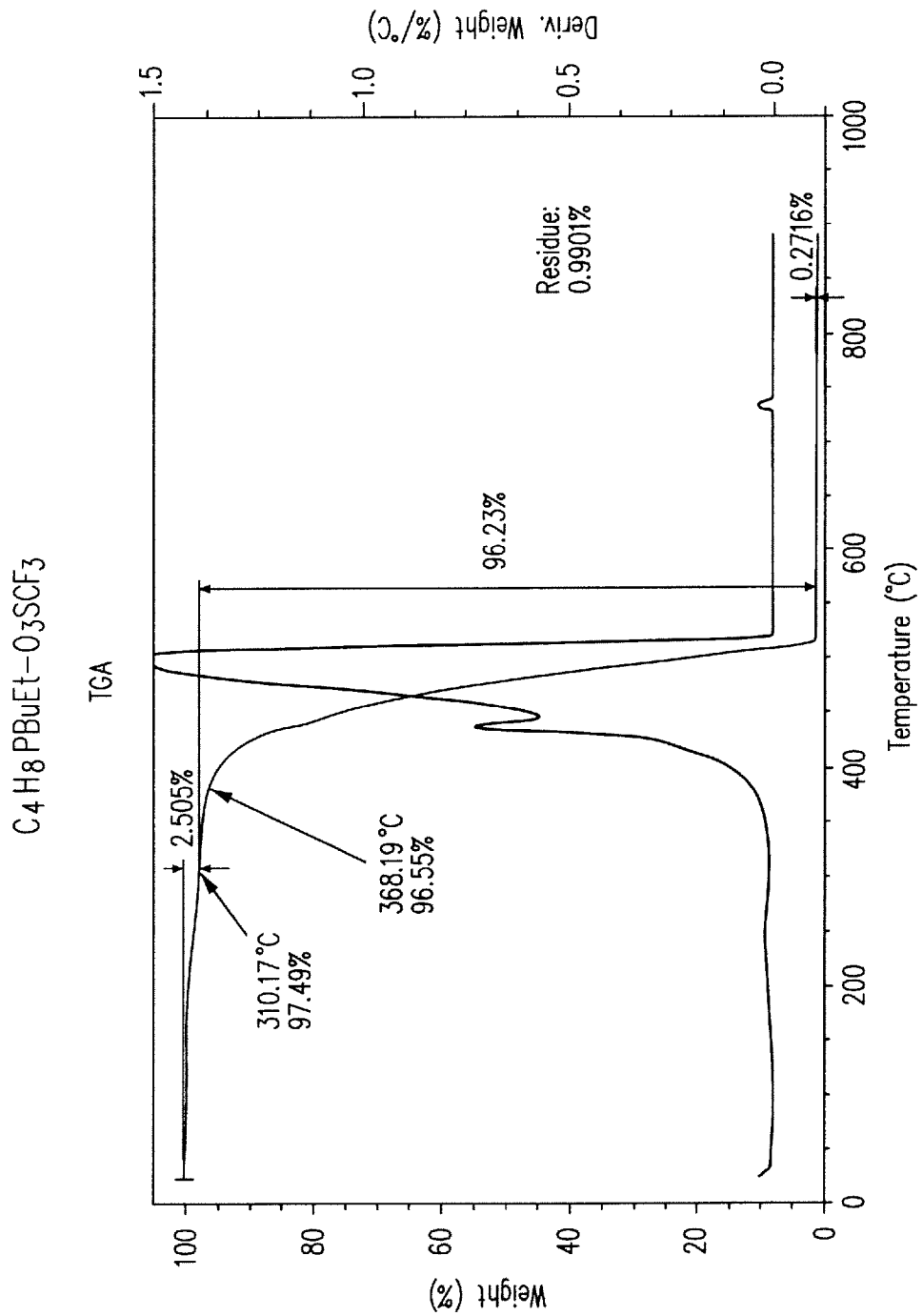
FIG. 11 is a graph showing thermogravimetric analysis (TGA) results for exemplary embodiments of phosphonium ionic liquids prepared according to Example 7.

A broad schematic of suitable macrocyclic ligands are shown and described in FIGS. 11 and 14 of U.S. Publication No. 2007/0108438, all of which is incorporated by reference herein in addition to FIGS. 11 and 14. In this embodiment, roughly based on porphyrins, a 16 member ring (when the —X-moiety contains a single atom, either carbon or a heteroatom), 17 membered rings (where one of the —X-moieties contains two skeletal atoms), 18 membered rings (where two of the —X-moieties contains two skeletal atoms), 19 membered rings (where three of the —X-moieties contains two skeletal atoms) or 20 membered rings (where all four of the —X-moieties contains two skeletal atoms), are all contemplated. Each —X-group is independently selected. The -Q-moiety, together with the skeletal —C-heteroatom-C (with either single or double bonds independently connecting the carbons and heteroatom) for 5 or 6 membered rings that are optionally substituted with 1 or 2 (in the case of 5 membered rings) or 1, 2, or 3 (in the case of 6 membered rings) with independently selected R2 groups. In some embodiments, the rings, bonds and substitutents are chosen to result in the compound being electronically conjugated, and at a minimum to have at least two oxidation states.

In some embodiments, the macrocyclic ligands of the invention are selected from the group consisting of porphyrins (particularly porphyrin derivatives as defined below), and cyclen derivatives.

Porphyrins

A particularly preferred subset of macrocycles suitable in the invention are porphyrins, including porphyrin derivatives. Such derivatives include porphyrins with extra rings ortho-fused, or ortho-perifused, to the porphyrin nucleus, porphyrins having a replacement of one or more carbon atoms of the porphyrin ring by an atom of another element (skeletal replacement), derivatives having a replacement of a nitrogen atom of the porphyrin ring by an atom of another element (skeletal replacement of nitrogen), derivatives having substituents other than hydrogen located at the peripheral (meso-, (3- or core atoms of the porphyrin, derivatives with saturation of one or more bonds of the porphyrin (hydroporphyrins, e.g., chlorins, bacteriochlorins, isobacteriochlorins, decahydroporphyrins, corphins, pyrrocorphins, etc.), derivatives having one or more atoms, including pyrrolic and pyrromethenyl units, inserted in the porphyrin ring (expanded porphyrins), derivatives having one or more groups removed from the porphyrin ring (contracted porphyrins, e.g., corrin, corrole) and combinations of the foregoing derivatives (e.g. phthalocyanines, sub-phthalocyanines, and porphyrin isomers). Additional suitable porphyrin derivatives include, but are not limited to the chlorophyll group, including etiophyllin, pyrroporphyrin, rhodoporphyrin, phylloporphyrin, phylloerythrin, chlorophyll a and b, as well as the hemoglobin group, including deuteroporphyrin, deuterohemin, hemin, hematin, protoporphyrin, mesohemin, hematoporphyrin mesoporphyrin, coproporphyrin, uruporphyrin and turacin, and the series of tetraarylazadipyrromethines.

As is true for the compounds outlined herein, and as will be appreciated by those in the art, each unsaturated position, whether carbon or heteroatom, can include one or more substitution groups as defined herein, depending on the desired valency of the system.

In one preferred embodiment, the redox-active molecule may be a metallocene, which can be substituted at any appropriate position, using R groups independently selected herein. A metallocene which finds particular use in the invention includes ferrocene and its derivatives. In this embodiment, preferred substituents include, but are not limited to, 4chlorophenyl, 3-acetamidophenyl, 2,4-dichloro-4-trifluoromethyl. Preferred substituents provide a redox potential range of less than about 2 volts.

It will be appreciated that the oxidation potentials of the members of the series can be routinely altered by changing the metal (M) or the substituents.

Another example of a redox-active molecule comprised of a porphyrin is shown in FIG. 12H of U.S. Publication No. 2007/018438 where F is a redox-active subunit (such as ferrocense, a substituted ferrocene, a metalloporphyrin, or a metallochlorin, and the like), J1 is a linker, M is a metal (such as Zn, Mg, Cd, Hg, Cu, Ag, Au, Ni, Pd, Pt, Co, Rh, Ir, Mn, B, Al, Ga, Pb and Sn) S1 and S2 are independently selected from the group of aryl, phenyl, cyclalkyl, alkyl, halogen, alkoxy, alkythio, perfluoroalkyl, perfluoroaryl, pyridyl, cyano, thiocyanato, nitro, amino, alkylamino, acyl, sulfoxyl, sulfonyl, imido, amido, and carbamoyl wherein said substituents provide a redox potential range of less than about 2 volts, K1, K2, K3 and K4 are independently selected from the group of N, O, S, Se, Te and CH; L is a linker, X is selected from the group of a substrate, a couple to a substrate, and a reactive site that can ionically couple to a substrate. In preferred embodiments, X or L-X may be an alcohol or a thiol. In some embodiments, L-X can be eliminated and replaced with a substituent independently selected from the same group as Slor S2.

Control over the hole-storage and hole-hopping properties of the redox-active units of the redox-active molecules used in the memory devices of the present invention allows fine control over the architecture of the memory device.

Such control is exercised through synthetic design. The hole-storage properties depend on the oxidation potential of the redox-active units or subunits that are themselves or are that are used to assemble the storage media used in the devices of this invention. The hole-storage properties and redox potential can be tuned with precision by choice of base molecule(s), associated metals and peripheral substituents (Yang et al. (1999) J. Porphyrins Phthalocyanines, 3: 117-147), the disclosure of which is herein incorporated by this reference.

For example, in the case of porphyrins, Mg porphyrins are more easily oxidized than Zn porphyrins, and electron withdrawing or electron releasing aryl groups can modulate the oxidation properties in predictable ways. Hole-hopping occurs among isoenergetic porphyrins in a nanostructure and is mediated via the covalent linker joining the porphyrins (Seth et al. (1994) J. Am. Chem. Soc., 116: 10578-10592, Seth et al (1996) J. Am. Chem. Soc., 118: 11194-11207, Strachan et al. (1997) J. Am. Chem. Soc., 119: 11191-11201; Li et al. (1997) J. Mater. Chem., 7: 1245-1262, Strachan et al. (1998) Inorg. Chem., 37: 1191-1201, Yang et al. (1999) J. Am. Chem. Soc., 121: 4008-4018), the disclosures of which are herein specifically incorporated by this reference in their entirety.

The design of compounds with predicted redox potentials is well known to those of ordinary skill in the art. In general, the oxidation potentials of redox-active units or subunits are well known to those of skill in the art and can be looked up (see, e.g., Handbook of Electrochemistry of the Elements). Moreover, in general, the effects of various substituents on the redox potentials of a molecule are generally additive. Thus, a theoretical oxidation potential can be readily predicted for any potential data storage molecule. The actual oxidation potential, particularly the oxidation potential of the information storage molecule(s) or the information storage medium can be measured according to standard methods. Typically the oxidation potential is predicted by comparison of the experimentally determined oxidation potential of a base molecule and that of a base molecule bearing one substituent in order to determine the shift in potential due to that particular substituent. The sum of such substituent-dependent potential shifts for the respective substituents then gives the predicted oxidation potential.

The suitability of particular redox-active molecules for use in the methods of this invention can readily be determined. The molecule(s) of interest are simply polymerized and coupled to a surface (e.g., a hydrogen passivated surface) according to the methods of this invention. Then sinusoidal voltammetry can be performed (e.g., as described herein or in U.S. Pat. Nos. 6,272,038; 6,212,093; and 6,208,553, PCT Publication WO 01/03126, or by (Roth et al. (2000) Vac. Sci. Technol. B 18:2359-2364; Roth et al. (2003) J.Am. Chem. Soc. 125:505-517) to evaluate 1) whether or not the molecule(s) coupled to the surface, 2) the degree of coverage (coupling); 3) whether or not the molecule(s) are degraded during the coupling procedure, and 4) the stability of the molecule(s) to multiple read/write operations.

In addition, included within the definition of "porphyrin" are porphyrin complexes, which comprise the porphyrin proligand and at least one metal ion. Suitable metals for the porphyrin compounds will depend on the heteroatoms used as coordination atoms, but in general are selected from transition metal ions. The term "transition metals" as used herein typically refers to the 38 elements in groups 3 through 12 of the periodic table. Typically transition metals are characterized by the fact that their valence electrons, or the electrons they use to combine with other elements, are present in more than one shell and consequently often exhibit several common oxidation states. In certain embodiments, the transition metals of this invention include, but are not limited to one or more of scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, rutherfordium, and/or oxides, and/or nitrides, and/or alloys, and/or mixtures thereof.

Other Macrocycles

There are a number of macrocycles based on cyclen derivatives. FIGS. 17 and 13C of U.S. Publication No. 2007/0108438 shows a number of macrocyclic proligands loosely based on cyclen/cyclam derivatives, which can include skeletal expansion by the inclusion of independently selected carbons or heteroatoms. In some embodiments, at least one R group is a redox active subunit, preferably electronically conjugated to the metal. In some embodiments, including when at least one R group is a redox active subunit, two or more neighboring R2 groups form cycle or an aryl group.

Furthermore, in some embodiments, macrocyclic complexes relying organometallic ligands are used. In addition to purely organic compounds for use as redox moieties, and various transition metal coordination complexes with δ-bonded organic ligand with donor atoms as heterocyclic or exocyclic substituents, there is available a wide variety of transition metal organometallic compounds with π-bonded organic ligands (see Advanced Inorganic Chemistry, 5th Ed., Cotton & Wilkinson, John Wiley & Sons, 1988, chapter 26; Organometallics, A Concise Introduction, Elschenbroich et al., 2nd Ed., 1992, VCH; and Comprehensive Organometallic Chemistry II, A Review of the Literature 1982-1994, Abel et al. Ed., Vol. 7, chapters 7, 8, 10 & 11, Pergamon Press, hereby expressly incorporated by reference). Such organometallic ligands include cyclic aromatic compounds such as the cyclopentadienide ion [C5H5(−1)] and various ring substituted and ring fused derivatives, such as the indenylide (−1) ion, that yield a class of bis(cyclopentadieyl)metal compounds, (i.e. the metallocenes); see for example Robins et al., J. Am. Chem. Soc. 104:1882-1893 (1982); and Gassman et al., J. Am. Chem. Soc. 108:4228-4229 (1986), incorporated by reference. Of these, ferrocene [(C5H5)2Fe] and its derivatives are prototypical examples which have been used in a wide variety of chemical (Connelly et al., Chem. Rev. 96:877-910 (1996), incorporated by reference) and electrochemical (Geiger et al., Advances in Organometallic Chemistry 23:1-93; and Geiger et al., Advances in Organometallic Chemistry 24:87, incorporated by reference) electron transfer or "redox" reactions. Metallocene derivatives of a variety of the first, second and third row transition metals are useful as redox moieties (and redox subunits). Other potentially suitable organometallic ligands include cyclic arenes such as benzene, to yield bis(arene)metal compounds and their ring substituted and ring fused derivatives, of which bis(benzene)chromium is a prototypical example, Other acyclic π-bonded ligands such as the allyl(−1) ion, or butadiene yield potentially suitable organometallic compounds, and all such ligands, in conduction with other π-bonded and δ-bonded ligands constitute the general class of organometallic compounds in which there is a metal to carbon bond. Electrochemical studies of various dimers and oligomers of such compounds with bridging organic ligands, and additional non-bridging ligands, as well as with and without metal-metal bonds are all useful.

When one or more of the co-ligands is an organometallic ligand, the ligand is generally attached via one of the carbon atoms of the organometallic ligand, although attachment may be via other atoms for heterocyclic ligands. Preferred organometallic ligands include metallocene ligands, including substituted derivatives and the metalloceneophanes (see page 1174 of Cotton and Wilkenson, supra). For example, derivatives of metallocene ligands such as methylcyclopentadienyl, with multiple methyl groups being preferred, such as pentamethylcyclopentadienyl, can be used to increase the stability of the metallocene. In some embodiments, the metallocene is derivatized with one or more substituents as outlined herein, particularly to alter the redox potential of the subunit or moiety.

As described herein, any combination of ligands may be used. Preferred combinations include: a) all ligands are nitrogen donating ligands; b) all ligands are organometallic ligands.

Sandwich Coordination Complexes

In some embodiments, the ReAMs are sandwich coordination complexes. The terms "sandwich coordination compound" or "sandwich coordination complex" refer to a compound of the formula L-Mn-L, where each L is a heterocyclic ligand (as described below), each M is a metal, n is 2 or more, most preferably 2 or 3, and each metal is positioned between a pair of ligands and bonded to one or more hetero atom (and typically a plurality of hetero atoms, e.g., 2, 3, 4, 5) in each ligand (depending upon the oxidation state of the metal). Thus sandwich coordination compounds are not organometallic compounds such as ferrocene, in which the metal is bonded to carbon atoms. The ligands in the sandwich coordination compound are generally arranged in a stacked orientation (i.e., are generally cofacially oriented and axially aligned with one another, although they may or may not be rotated about that axis with respect to one another) (see, e.g., Ng and Jiang (1997) Chemical Society Reviews 26: 433-442) incorporated by reference. Sandwich coordination complexes include, but are not limited to "double-decker sandwich coordination compound" and "triple-decker sandwich coordination compounds". The synthesis and use of sandwich coordination compounds is described in detail in U.S. Pat. Nos. 6,212,093; 6,451,942; 6,777,516; and polymerization of these molecules is described in U.S. Publication No. 2007/0123618, all of which are included herein, particularly the individual substitutent groups that find use in both sandwich complexes and the "single" macrocycle" complexes.

The term "double-decker sandwich coordination compound" refers to a sandwich coordination compound as described above where n is 2, thus having the formula L'-M'-LZ, wherein each of L1 and LZ may be the same or different (see, e.g., Jiang et al. (1999) J. Porphyrins Phthalocyanines 3: 322-328) and U.S. Pat. Nos. 6,212,093; 6,451,942; 6,777, 516; and polymerization of these molecules is described in U.S. Publication No. 2007/0123618, hereby incorporated by reference in its entirety.

The term "triple-decker sandwich coordination compound" refers to a sandwich coordination compound as described above where n is 3, thus having the formula L'-M' LZ-MZ-L3, wherein each of L1, LZ and L3 may be the same or different, and Ml and MZ may be the same or different (see, e.g., Arnold et al. (1999) Chemistry Letters 483-484), and U.S. Pat. Nos. 6,212,093; 6,451,942; 6,777,516; and polymerization of these molecules is described in U.S. Publication No. 2007/0123618, hereby incorporated by reference in their entirety.

In addition, polymers of these sandwich compounds are also of use; this includes "dyads" and "triads" as described in U.S. Pat. Nos. 6,212,093; 6,451,942; 6,777,516; and polymerization of these molecules is described in U.S. Publication No. 2007/0123618, incorporated by reference.

Non-Macrocyclic Proligands and Complexes

As a general rule, ReAMs comprising non-macrocyclic chelators are bound to metal ions to form non-macrocyclic chelate compounds, since the presence of the metal allows for multiple proligands to bind together to give multiple oxidation states.

In some embodiments, nitrogen donating proligands are used. Suitable nitrogen donating proligands are well known in the art and include, but are not limited to, NH2; NHR; NRR'; pyridine; pyrazine; isonicotinamide; imidazole; bipyridine and substituted derivatives of bipyridine; terpyridine and substituted derivatives; phenanthrolines, particularly 1,10-phenanthroline (abbreviated phen) and substituted derivatives of phenanthrolines such as 4,7-dimethylphenanthroline and dipyridol[3,2-a:2',3'-c]phenazine (abbreviated dppz); dipyridophenazine; 1,4,5,8,9,12-hexaazatriphenylene (abbreviated hat); 9,10-phenanthrenequinone diimine (abbreviated phi); 1,4,5,8-tetraazaphenanthrene (abbreviated tap); 1,4,8,11-tetra-azacyclotetradecane (abbreviated cyclam) and isocyanide. Substituted derivatives, including fused derivatives, may also be used. It should be noted that macrocylic ligands that do not coordinatively saturate the metal ion, and which require the addition of another proligand, are considered non-macrocyclic for this purpose. As will be appreciated by those in the art, it is possible to covalent attach a number of "non-macrocyclic" ligands to form a coordinatively saturated compound, but that is lacking a cyclic skeleton.

Suitable sigma donating ligands using carbon, oxygen, sulfur and phosphorus are known in the art. For example, suitable sigma carbon donors are found in Cotton and Wilkenson, Advanced Organic Chemistry, 5th Edition, John Wiley & Sons, 1988, hereby incorporated by reference; see page 38, for example. Similarly, suitable oxygen ligands include crown ethers, water and others known in the art. Phosphines and substituted phosphines are also suitable; see page 38 of Cotton and Wilkenson.

The oxygen, sulfur, phosphorus and nitrogen-donating ligands are attached in such a manner as to allow the heteroatoms to serve as coordination atoms.

Polynucleating Proligands and Complexes

In addition, some embodiments utilize polydentate ligands that are polynucleating ligands, e.g. they are capable of binding more than one metal ion. These may be macrocyclic or non-macrocyclic.

A number of suitable proligands and complexes, as well as suitable substituents, are outlined in U.S. Pat. Nos. 6,212,093; 6,728,129; 6,451,942; 6,777,516; 6,381,169; 6,208,553; 6,657,884; 6,272,038; 6,484,394; and U.S. patent application Ser. Nos. 10/040,059; 10/682,868; 10/445,977; 10/834,630; 10/135,220; 10/723,315; 10/456,321; 10/376,865; all of which are expressly incorporated by reference, in particular for the structures and descriptions thereof depicted therein.

Applications and Uses of the Phosphonium Ionic Liquids

As used herein and unless otherwise indicated, the term "memory element," "memory cell," or "storage cell" refer to an electrochemical cell that can be used for the storage of information. Preferred "storage cells" are discrete regions of storage medium addressed by at least one and preferably by two electrodes (e.g., a working electrode and a reference electrode). The storage cells can be individually addressed (e.g., a unique electrode is associated with each memory element) or, particularly where the oxidation states of different memory elements are distinguishable, multiple memory elements can be addressed by a single electrode. The memory element can optionally include a dielectric (e.g., a dielectric impregnated with counter ions).

As used herein the term "electrode" refers to any medium capable of transporting charge (e.g., electrons) to and/or from a storage molecule. Preferred electrodes are metals and conductive organic molecules, including, but not limited to, Group III elements (including doped and oxidized Group III elements), Group IV elements (including doped and oxidized Group IV elements), Group V elements (including doped and oxidized Group V elements) and transition metals (including transition metal oxides and transition metal nitrides). The electrodes can be manufactured to virtually and 2-dimensional or 3-dimensional shape (e.g., discrete lines, pads, planes, spheres, cylinders).

As used herein and unless otherwise indicated, the term "multiple oxidation states" means more than one oxidation state. In preferred embodiments, the oxidation states may reflect the gain of electrons (reduction) or the loss of electrons (oxidation).

As used herein and unless otherwise indicated, the term "multiporphyrin array" refers to a discrete number of two or more covalently-linked porphyrinic macrocycles. The multiporphyrin arrays can be linear, cyclic, or branched.

As used herein and unless otherwise indicated, the term "output of an integrated circuit" refers to a voltage or signal produced by one or more integrated circuit(s) and/or one or more components of an integrated circuit.

As used herein and unless otherwise indicated, the term "present on a single plane," when used in reference to a memory device of this invention refers to the fact that the component(s) (e.g. storage medium, electrode(s), etc.) in question are present on the same physical plane in the device (e.g. are present on a single lamina). Components that are on the same plane can typically be fabricated at the same time, e.g., in a single operation. Thus, for example, all of the electrodes on a single plane can typically be applied in a single (e.g., sputtering) step (assuming they are all of the same material).

As used herein and unless otherwise indicated, a potentiometric device is a device capable of measuring potential across an interface that results from a difference in the equilibrium concentrations of redox molecules in an electrochemical cell.

As used herein and unless otherwise indicated, the term "oxidation" refers to the loss of one or more electrons in an element, compound, or chemical substituent/subunit. In an oxidation reaction, electrons are lost by atoms of the element(s) involved in the reaction. The charge on these atoms must then become more positive. The electrons are lost from the species undergoing oxidation and so electrons appear as products in an oxidation reaction. An oxidation taking place in the reaction $Fe^{2+}$ (aq)→$Fe^{3+}$ (aq)+$e^-$ because electrons are lost from the species being oxidized, $Fe^{2+}$ (aq), despite the apparent production of electrons as "free" entities in oxidation reactions. Conversely the term reduction refers to the gain of one or more electrons by an element, compound, or chemical substituent/subunit.

As used herein and unless otherwise indicated, the term "oxidation state" refers to the electrically neutral state or to the state produced by the gain or loss of electrons to an element, compound, or chemical substituent/subunit. In a preferred embodiment, the term "oxidation state" refers to states including the neutral state and any state other than a neutral state caused by the gain or loss of electrons (reduction or oxidation).

As used herein and unless otherwise indicated, the term "read" or "interrogate" refer to the determination of the oxidation state(s) of one or more molecules (e.g. molecules comprising a storage medium).

As used herein and unless otherwise indicated, the term "redox-active unit" or "redox-active subunit" refers to a molecule or component of a molecule that is capable of being oxidized or reduced by the application of a suitable voltage.

As used herein and unless otherwise indicated, the terms "read" or "interrogate" refer to the determination of the oxidation state(s) of one or more molecules (e.g. molecules comprising a storage medium).

As used herein and unless otherwise indicated, the term "refresh" when used in reference to a storage molecule or to a storage medium refers to the application of a voltage to the storage molecule or storage medium to re-set the oxidation state of that storage molecule or storage medium to a predetermined state (e.g., the oxidation state the storage molecule or storage medium was in immediately prior to a read).

As used herein and unless otherwise indicated, the term "reference electrode" is used to refer to one or more electrodes that provide a reference (e.g., a particular reference voltage) for measurements recorded from the working electrode. In preferred embodiments, the reference electrodes in a memory device of this invention are at the same potential although in some embodiments this need not be the case.

As used herein and unless otherwise indicated, a "sinusoidal voltammeter" is a voltammetric device capable of determining the frequency domain properties of an electrochemical cell.

As used herein and unless otherwise indicated, the term "storage density" refers to the number of bits per volume and/or bits per molecule that can be stored. When the storage medium is said to have a storage density greater than one bit per molecule, this refers to the fact that a storage medium preferably comprises molecules wherein a single molecule is capable of storing at least one bit of information.

As used herein and unless otherwise indicated, the term "storage location" refers to a discrete domain or area in which a storage medium is disposed. When addressed with one or more electrodes, the storage location may form a storage cell. However if two storage locations contain the same storage media so that they have essentially the same oxidation states, and both storage locations are commonly addressed, they may form one functional storage cell.

As used herein and unless otherwise indicated, the term "storage medium" refers to a composition comprising a storage molecule of the invention, preferably bonded to a substrate.

A substrate is a, preferably solid, material suitable for the attachment of one or more molecules. Substrates can be formed of materials including, but not limited to glass, plastic, silicon, minerals (e.g., quartz), semiconducting materials, ceramics, metals, etc.

As used herein and unless otherwise indicated, the term "voltammetric device" is a device capable of measuring the current produced in an electrochemical cell as a result of the application of a voltage or change in voltage.

As used herein and unless otherwise indicated, a voltage source is any source (e.g. molecule, device, circuit, etc.) capable of applying a voltage to a target (e.g., an electrode).

As used herein and unless otherwise indicated, the term "working electrode" is used to refer to one or more electrodes that are used to set or read the state of a storage medium and/or storage molecule.

Devices

Some embodiments of the phosphonium ionic liquid compositions of the present invention are useful in forming a variety of hybrid electrical devices. For example, in one embodiment a device is provided, comprising a first electrode, a second electrode; and an electrolyte comprised of an ionic liquid composition, the ionic liquid composition comprising: one or more phosphonium based cations of the general formula:

$R^1R^2R^3R^4P$ where $R^1$, $R^2$, $R^3$ and $R^4$ are optional and each independently a substituent group; and one or more anions, and wherein said electrolyte is electrically coupled to at least one of said first and second electrodes. In some embodiment the first electrode is comprised redox active molecules (ReAMs) as described in detail above.

In another embodiment a molecular storage device is provided, comprising a working electrode and a counter electrode configured to afford electrical capacitance; and an ion conducting composition comprising: one or more phosphine based cations of the general formula above and wherein the ion conducting composition is electrically coupled to at least the working and counter electrodes.

In another embodiment the invention encompasses a molecular memory element that includes a switching device, a bit line and a word line coupled to the switching device and a molecular storage device accessible through the switching device. The molecular storage device is capable of being placed in two or more discrete states, wherein the molecular storage device is placed in one of the discrete states by signals applied to the bit and word line. The molecular storage device comprises a first electrode, a second electrode and an electrolyte of phosphonium based cations and suitable anions between the first and second electrode. Another embodiment encompasses molecular memory arrays comprising a plurality of molecular storage elements where each molecular storage element is capable of being placed in two or more discrete states. A plurality of bit lines and word lines are coupled to the plurality of molecular storage elements such that each molecular storage element is coupled to and addressable by at least one bit line and at least one word line.

The molecular memory device may include an addressable array of molecular storage elements. An address decoder receives a coded address and generates word line signals corresponding to the coded address. A word line driver is coupled to the address decoder and produces amplified word line signals. The amplified word line signals control switches that selectively couple members of the array of molecular storage elements to bit lines. Read/write logic coupled to the bit lines determines whether the molecular memory device is in a read mode or a write mode. In a read mode, sense amplifiers coupled to each bit line detect an electronic state of the selectively coupled molecular storage elements and produce a data signal on the bit line indicative of the electronic state of the selectively coupled molecular storage elements. In a write mode, the read/write logic drives a data signal onto the bit lines and the selectively coupled molecular storage elements.

Another embodiment encompasses devices including logic integrated with embedded molecular memory devices such as application specific integrated circuit (ASIC) and system on chip (SOC) devices and the like. Such implementations comprise one or more functional components formed monolithically with and interconnected to molecular memory devices. The functional components may comprise solid state electronic devices and/or molecular electronic devices.

In particular embodiments, the molecular storage device is implemented as a stacked structured formed subsequent to and above a semiconductor substrate having active devices formed therein. In other embodiments, the molecular storage device is implemented as a micron or nanometer sized hole in a semiconductor substrate have active devices formed therein. The molecular storage device is fabricated using processing techniques that are compatible with the semiconductor substrate and previously formed active devices in the semiconductor substrate. The molecular storage device comprises, for example, an electrochemical cell having two or more electrode surfaces separated by an electrolyte (e.g., a ceramic or solid electrolyte). Storage molecules (e.g., molecules having one or more oxidation states that can be used for storing information) are coupled to an electrode surface within the electrochemical cells.

Other embodiments of the invention include the use of components independently selected from transistor switching devices including field effect transistor; a row decoder coupled to the word line; a column decoder coupled to the bit line; a current preamplifier connected to the bit line; a sense amplifier connected to the bit line, an address decoder that receives a coded address and generates word line signals corresponding to the coded address, a line driver coupled to the address decoder wherein the line driver produces amplified word line signals (optionally wherein the amplified word line signals control switches that selectively couple members of the array of molecular storage elements to bit lines), read/write logic coupled to the bit lines, wherein the read/write logic determines whether the molecular memory devices is in a read mode or a write mode, sense amplifiers coupled to each bit line, wherein when the device is in a read mode, sense amplifiers coupled to each bit line detect an electronic state of the selectively coupled molecular storage elements and produce a data signal on the bit line indicative of the electronic state of the selectively coupled molecular storage elements (such that when the device is in a write mode, the read/write logic drives a data signal onto the bit lines and the selectively coupled molecular storage elements) electrolyte layers; and combinations thereof.

Further embodiments encompass the second electrode being coupled to ground, and the bit and word lines being either perpendicular or parallel.

Additional embodiments have the memory arrays of the invention comprising volatile memory such as DRAM or SRAM, or non-volatile memory such as Flash or ferroelectric memory.

A further embodiment provides arrays wherein the molecular storage device comprises an attachment layer formed on the first electrode, wherein the attachment layer comprises an opening and wherein the molecular material is in the opening and electronically coupled to the second electrode layer and an electrolyte layer formed on the attachment layer.

Another embodiment encompasses a monolithically integrated device comprising logic devices configured to perform a particular function and embedded molecular memory devices of the invention coupled to the logic devices. The device may optionally comprise an application specific integrated circuit (ASIC), a system on chip (SOC), a solid state electronic devices or molecular electronic devices.

The memory devices of this invention can be fabricated using standard methods well known to those of skill in the art. In a preferred embodiment, the electrode layer(s) are applied to a suitable substrate (e.g., silica, glass, plastic, ceramic, etc.) according to standard well known methods (see, e.g., Rai-Choudhury (1997) The Handbook of Microlithography, Micromachining, and Microfabrication, SPIE Optical Engineering Press; Bard & Faulkner (1997) Fundamentals of Microfabrication). A variety of techniques are described below and also in U.S. Pat. Nos. 6,212,093; 6,728,129; 6,451,942; 6,777,516; 6,381,169; 6,208,553; 6,657,884; 6,272,038; 6,484,394; and U.S. Ser. Nos. 10/040,059; 10/682,868; 10/445,977; 10/834,630; 10/135,220; 10/723,315; 10/456,321; 10/376,865; and U.S. Publication No. 20070123618, all of which are expressly incorporated by reference, in particular for the fabrication techniques outlined therein.

There are a wide variety of device and systems architectures that benefit from the use of molecular memory.

Memory devices are operated by receiving an N-bit row address into row address decoder and an M-bit column address into column address decoder. The row address decoder generates a signal on one word line. Word lines may include word line driver circuitry that drives a high current signal onto word lines. Because word lines tend to be long, thin conductors that stretch across much of the chip surface, it requires significant current and large power switches to drive a word lines signal. As a result, line driver circuits are often provided with power supply in addition to power supply circuits (not shown) that provide operating power for the other logic. Word line drivers, therefore, tend to involve large components and the high speed switching of large currents tends to create noise, stress the limits of power supplies and power regulators, and stress isolation structures.

In a conventional memory array there are more columns (bit lines) than rows (word lines) because during refresh operations, each word line is activated to refresh all of storage elements coupled to that word line. Accordingly, the fewer the number of rows, the less time it takes to refresh all of the rows. One feature of the present invention is that the molecular memory elements can be configured to exhibit significantly longer data retention than typical capacitors, in the order of tens, hundreds, thousands or effectively, unlimited seconds. Hence, the refresh cycle can be performed orders of magnitude less frequently or omitted altogether. Accordingly, refresh considerations that actually affect the physical layout of a memory array can be relaxed and arrays of various geometry can be implemented. For example, memory array can readily be manufactured with a larger number of word lines, which will make each word line shorter. As a result, word line driver circuits can be made smaller or eliminated because less current is required to drive each word line at a high speed. Alternatively or in addition, shorter word lines can be driven faster to improve read/write access times. As yet another alternative, each row of memory locations can be provided with multiple word lines to provide a mechanism for storing multiple states of information in each memory location.

Sense amplifiers are coupled to each bit line and operate to detect signals on bit lines 109 that indicate the state of a memory element coupled to that bit line, and amplify that state to an appropriate logic level signal. In one embodiment, sense amplifiers may be implemented with substantially conventional designs as such conventional designs will operate to detect and amplify signals from a molecular memory element. Alternatively, unlike conventional capacitors, some molecular storage elements provide very distinct signals indicating their state. These distinct signals may reduce the need for conventional sense amplifier logic as the state signal from a molecular storage device can be more readily and reliably latched into buffers of read/write logic than can signals stored in conventional capacitors. That is, the present invention can provide devices which are sufficiently large as to obviate the need for a sense amplifier.

Read/write logic includes circuitry for placing the memory device in a read or write state. In a read state, data from molecular array is placed on bit lines (with or without the operation of sense amplifiers), and captured by buffers/latches in read/write logic. Column address decoder will select which bit lines are active in a particular read operation. In a write operation, read/write logic drives data signals onto the selected bit lines such that when a word line is activated, that data overwrites any data already stored in the addressed memory element(s).

A refresh operation is substantially similar to a read operation; however, the word lines are driven by refresh circuitry (not shown) rather than by externally applied addresses. In a refresh operation, sense amplifiers, if used, drive the bit lines to signal levels indicating the current state of the memory elements and that value is automatically written back to the memory elements. Unlike a read operation, the state of bit lines is not coupled to read/write logic during a refresh. This operation is only required if the charge retention time of the molecules used is less than the operational life of the device used, for example, on the order of 10 years for Flash memory.

In an exemplary embedded system that comprises a central processing unit and molecular memory, a memory bus couples a CPU and molecular memory device to exchange address, data, and control signals. Optionally, embedded system may also contain conventional memory coupled to memory bus. Conventional memory may include random access memory (e.g., DRAM, SRAM, SDRAM and the like), or read only memory (e.g., ROM, EPROM, EEPROM and the like). These other types of memory may be useful for caching data molecular memory device, storing operating system or BIOS files, and the like. Embedded system may include one or more input/output (I/O) interfaces that enable CPU to communicate with external devices and systems. I/O interface may be implemented by serial ports, parallel ports, radio frequency ports, optical ports, infrared ports and the like. Further, interface may be configured to communicate using any available protocol including packet-based protocols.

Batteries

Phosphonium ionic liquids and compositions according to embodiments of the present invention are well suited as electrolytes in battery applications. In one embodiment, a battery is provided comprising: a positive electrode, a negative electrode, a separator between said positive and negative electrode; and an electrolyte. The electrolyte is comprised of an ionic liquid composition, the ionic liquid composition comprising: one or more phosphonium based cations of the general formula:

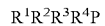

$$R^1R^2R^3R^4P$$

wherein: $R^1$, $R^2$, $R^3$ and $R^4$ are optional and each independently a substituent group; and one or more anions. In another embodiment, the electrolyte is characterized as an ionic liquid composition having one or more phosphine based cations, and one or more anions, wherein the ionic liquid composition exhibits thermodynamic stability up to a temperature of approximately 375° C. or greater, and ionic conductivity up to 10 mS/cm. In some embodiments, the ionic liquid composition is doped, such as for example with lithium. In another embodiment, the ionic liquid composition is used as a fuel cell membrane.

Electrolytic Films

Phosphonium ionic liquids and compositions according to embodiments of the present invention are well suited as electrolytic films. In one embodiment, an electrolytic film is provided comprising: a phosphonium ionic liquid composition applied to a substrate. In one example, the electrolytic film is formed by providing the phosphonium ionic liquid of the present invention together with a solvent. The ionic liquid and solvent are applied to a substrate by any suitable means, such as by spin coating, and the like. Then substrate is then heated to remove the solvent, leaving the electrolytic or ionically-conducting film. In other embodiments, solutions of ionic liquids and polymers, in suitable solvents, are coated onto substrates, such as by spin coating, and then the solvent is evaporated. This results in the formation of conductive ionic liquid-polymer gels/film. Such films are particularly suitable as battery electrolytes and fuel cell membranes.

Heat Transfer Medium

The desirable properties of high thermodynamic stability, low volatility and wide liquidus of the phosphonium ionic liquids of the present invention are well suited as heat transfer medium. In this embodiment, high conductivity is not as important, except in the instance of fuel cells and DSSC applications. Some embodiments of the present invention provide a heat transfer medium, comprising an ionic liquid composition comprising: one or more phosphine based cations, and one or more anions, wherein the ionic liquid composition exhibits thermodynamic stability up to a temperature of approximately 375° C. In some embodiments, the heat transfer medium of the invention is a high temperature reaction media. In another embodiment, the heat transfer medium of the invention is an extraction media.

Other Applications

The phosphonium ionic liquids of the present invention find use in additional applications. In one exemplary embodiment, an embedded capacitor is proved. In one embodiment the embedded capacitor is comprised of a dielectric disposed between two electrodes, where the dielectric is comprised of an electrolytic film of a phosphonium ionic composition as described above. The embedded capacitor of the present invention may be embedded in an integrated circuit package. Further embodiments include "on-board" capacitor arrangements.

EXAMPLES

Embodiments of the present invention are now described in further detail with reference to specific Examples. The Examples provided below are intended for illustration purposes only and in no way limit the scope and/or teaching of the invention.

In general, Phosphonuim ionic liquids were prepared by either metathesis reactions of the appropriately substituted phosphonium solid salt with the appropriately substituted metal salt, or by reaction of appropriately substituted phosphine precursors with an appropriately substituted anion precursor. FIGS. 1 to 4 illustrate reaction schemes to make four exemplary embodiments of phosphonium ionic liquids of the present invention.

Example 1

Figure 5:
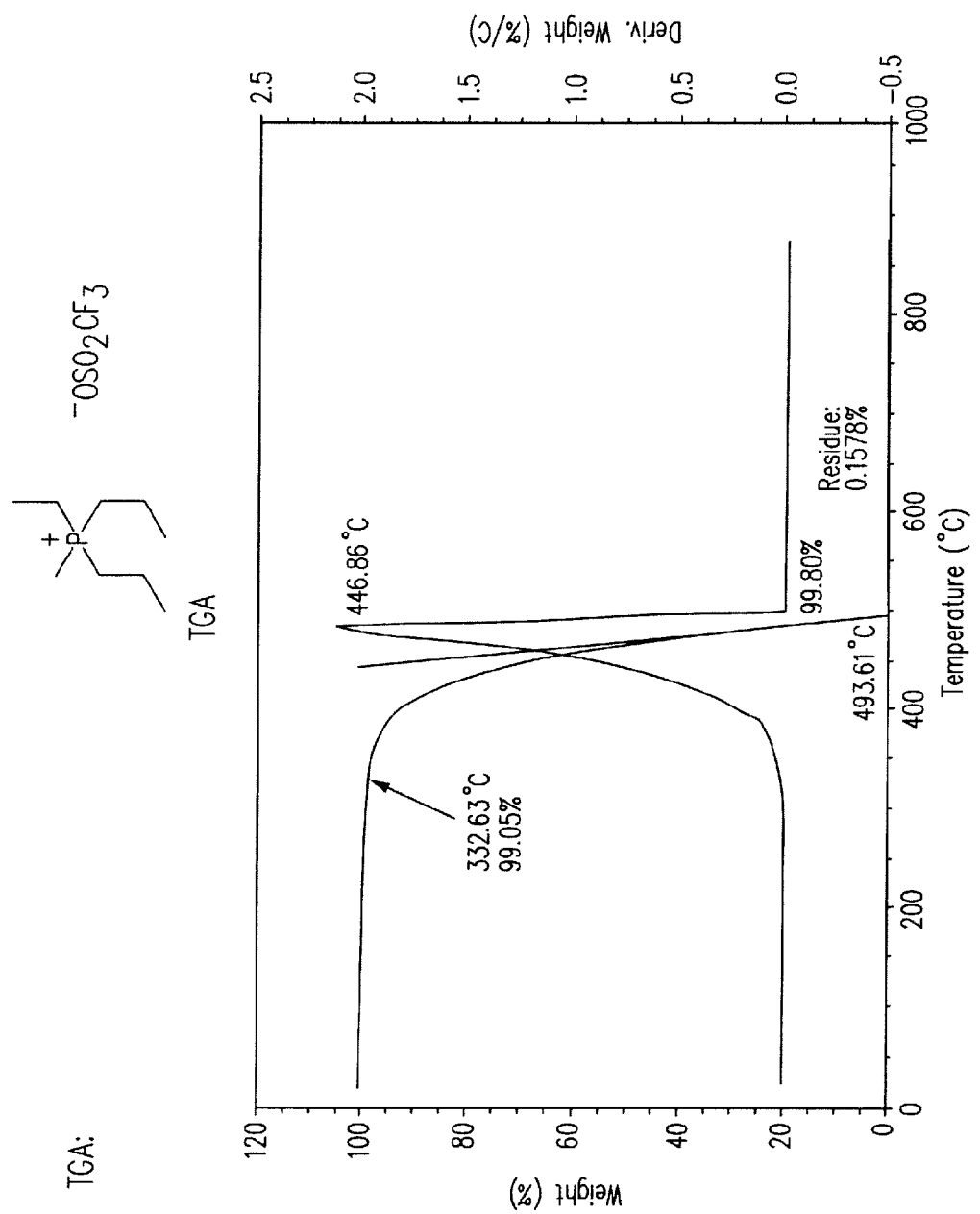
FIG. 5 is a thermogravimetric analysis (TGA) graph performed on exemplary embodiments of phosphonium ionic liquids prepared according to Example 1.

Phosphonium ionic liquids were prepared. $AgSO_3CF_3$ was charged into a 50 ml round bottom (Rb) flask and assembled to a 3 cm swivel frit. The first was evacuated and brought into a glove box. In the glove box, di-n-proply ethyl methyl phosphonium iodide was added and the first re-assembled, brought to the vacuum line, evacuated, and anydrous THF was vacuum transferred in. The flask was allowed to warm to room temperature and was then heated to 40° C. for 2 hours. This resulted in the formation of a light green bead-like solid. This solid was removed by filtration. This yielded a pearly, opalescent solution. Volatile materials were removed under high vacuum with heating using a 30° C. hot water bath. This resulted in a white crystalline material with a yield of 0.470 g. Thermogravimetric Analysis (TGA) was performed on the material and the results are shown in FIG. 5.

Example 2

Figure 6A:
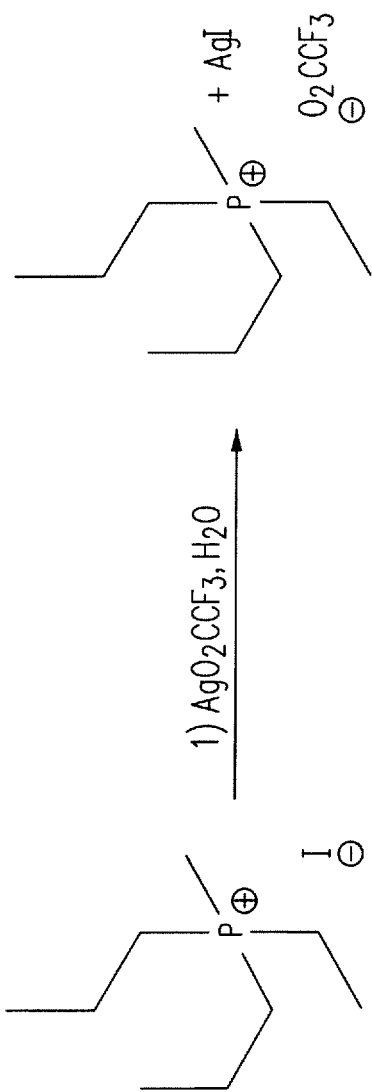
FIG. 6A depicts a reaction scheme.
Figure 6B:
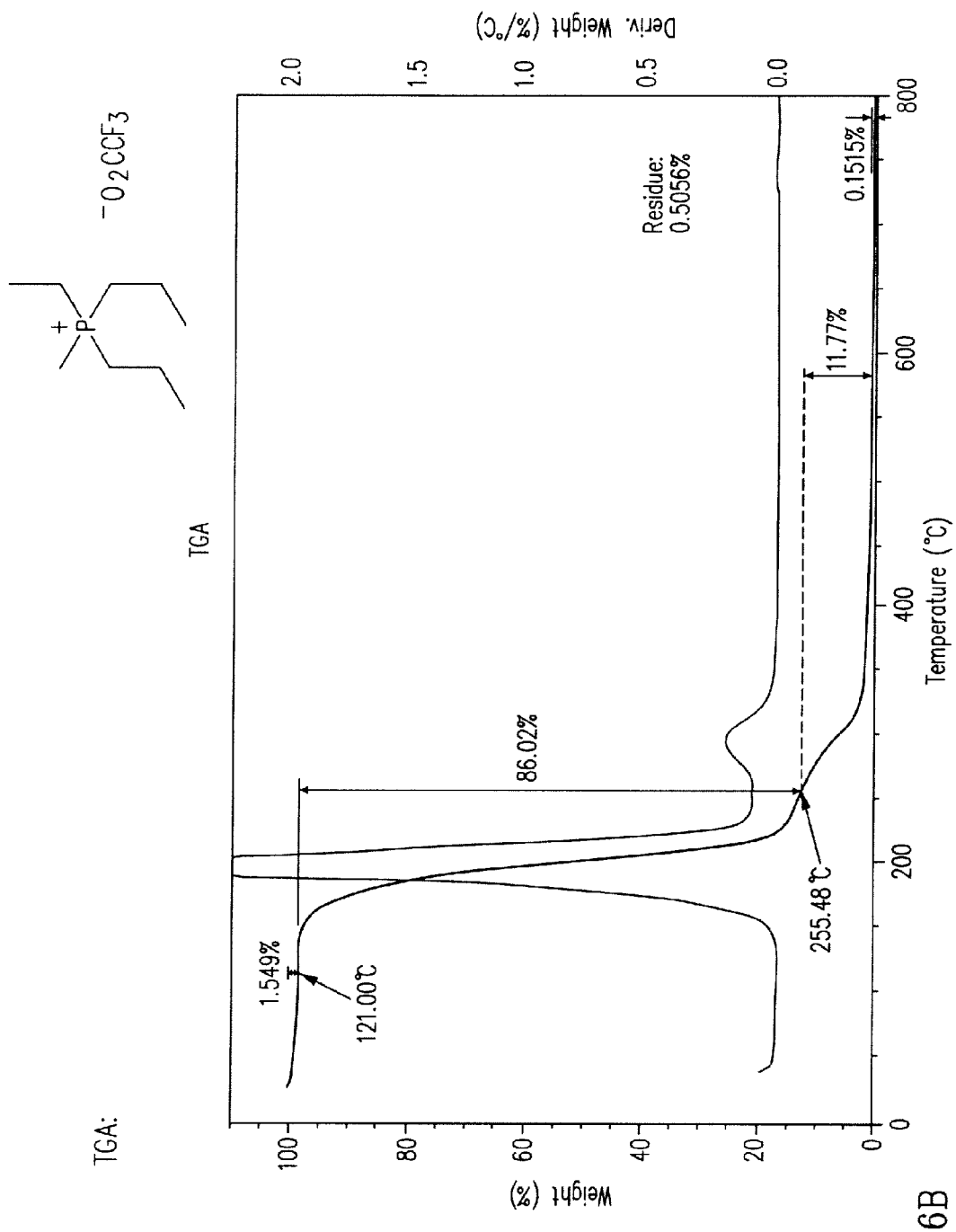
FIGS. 6B and 6C illustrate thermogravimetric analysis (TGA) and evolved gas analysis (EGA) graphs, respectively, for exemplary embodiments of phosphonium ionic liquids prepared according to Example 2.
Figure 6C:
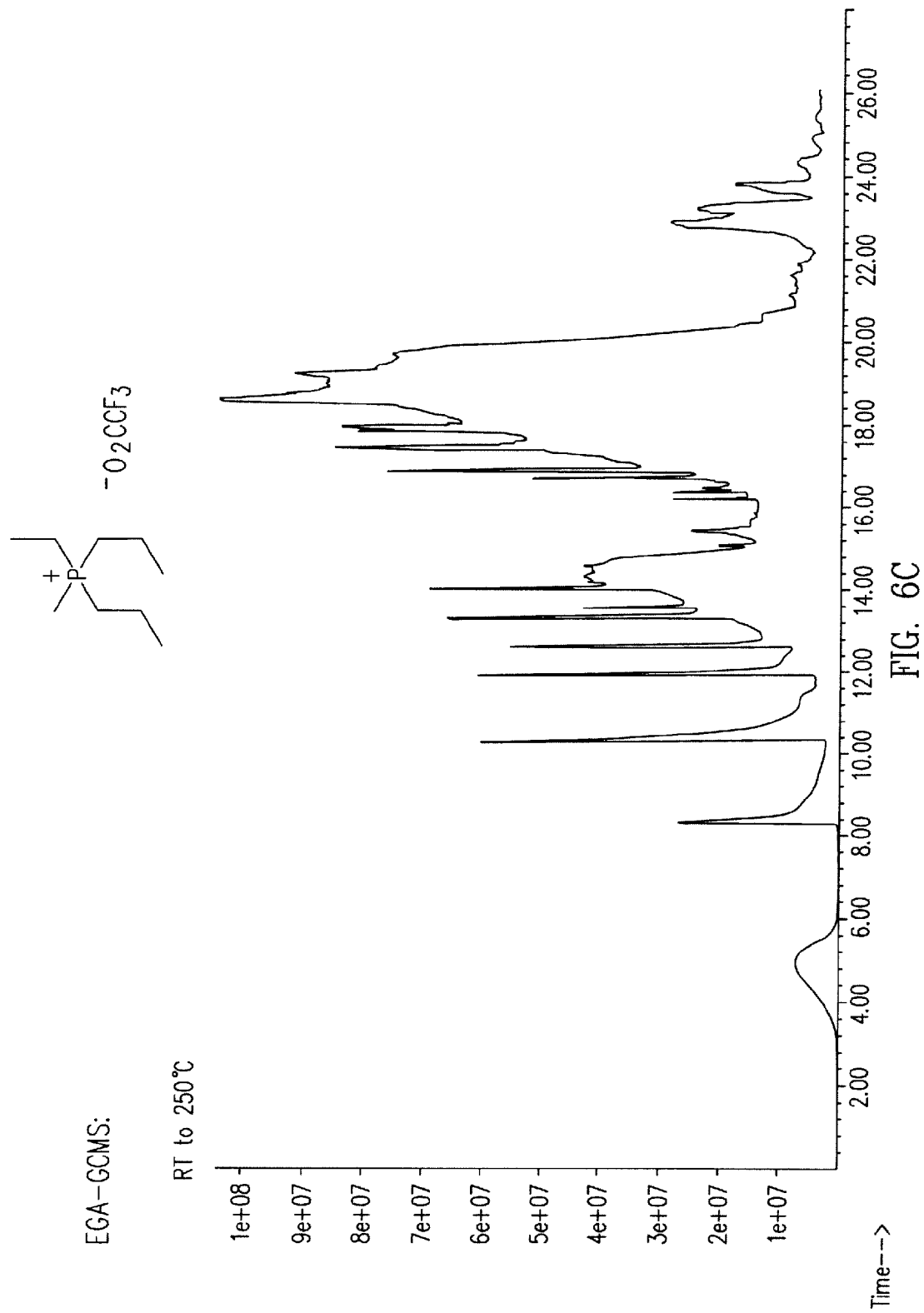

Further phosphonium ionic liquids were prepared. Di-n-propyl ethyl methyl phosphonium iodide was added to a 100 ml Rb flask in a glove box, then removed and dissolved in 50 ml of DI $H_2O$. To this solution, $AgO_2CCF_3$ was added, immediately yielding a yellow, bead-like precipitate. After stirring for 2 hours, AgI was removed by filtration and the cake was washed 3 times with 5 ml each of DI $H_2O$. The bulk water was removed on the rotary evaporator. This yielded a clear, low viscosity liquid which was then dried under high vacuum with heating and stirring. This resulted in solidification of the material. Gentle warming of the white solid in a warm water bath resulted in a liquid which appeared to melt just above room temperature. This experiment yielded 0.410 g of material. The reaction scheme is depicted in FIG. 6A. Thermogravimetric analysis (TGA) and evolved gas analysis (EGA) tests were performed on the material and the results are shown in FIG. 6B and FIG. 6C, respectively.

Example 3

Figure 7A:
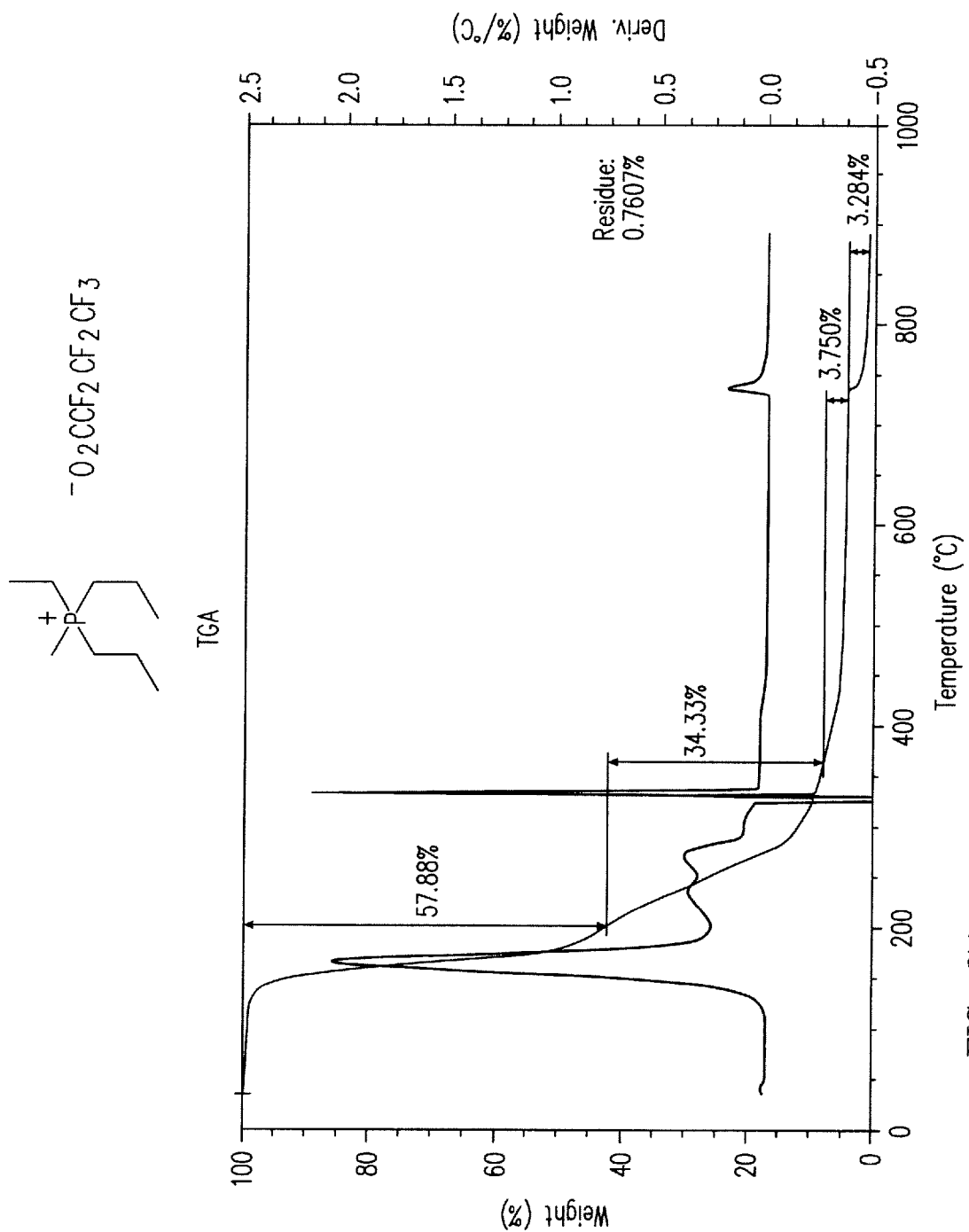
FIGS. 7A and 7B are graphs illustrating thermogravimetric analysis (TGA) and evolved gas analysis (EGA), respectively, for exemplary embodiments of phosphonium ionic liquids prepared according to Example 3.
Figure 7B:
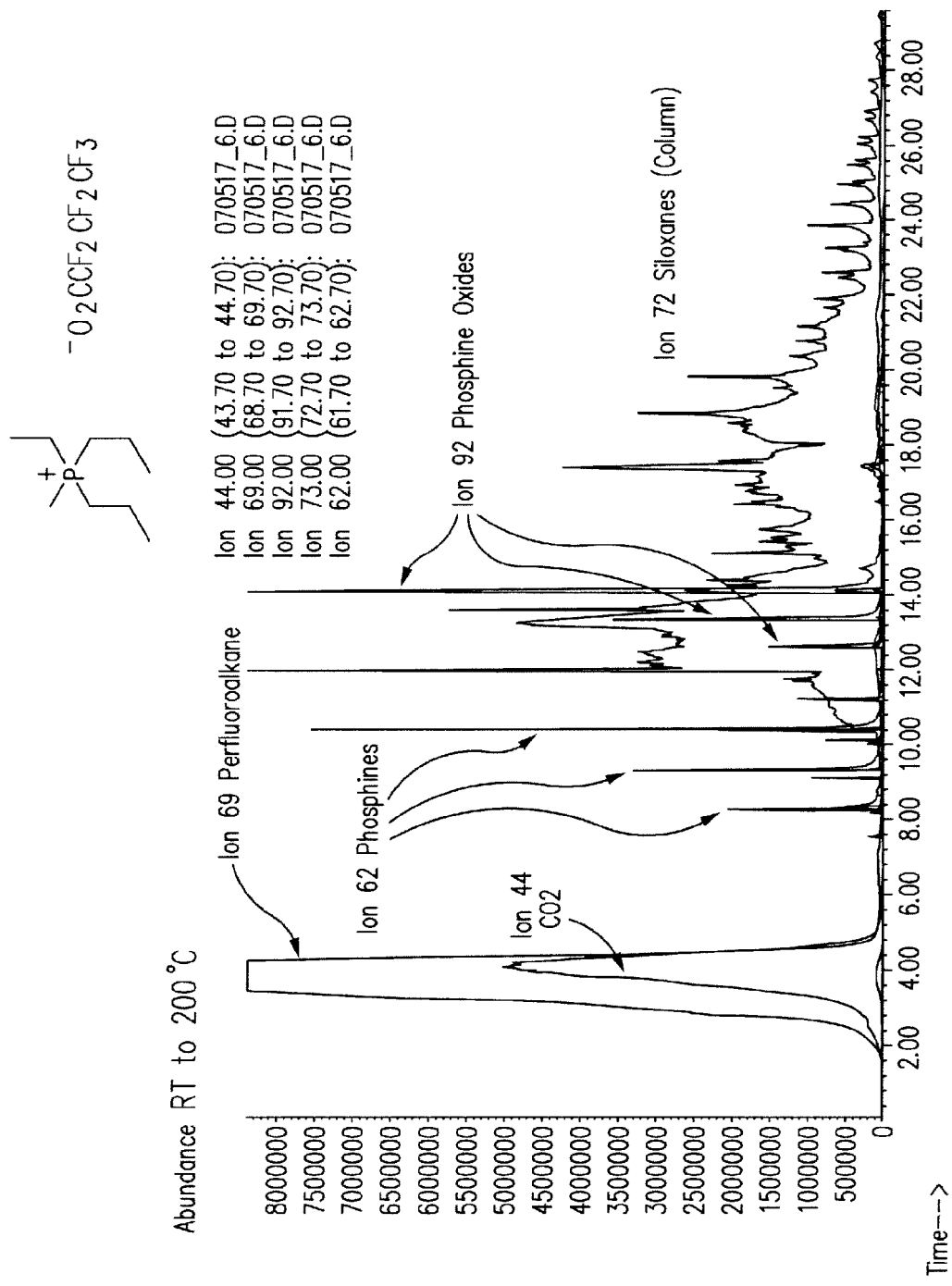

In this example, di-n-propyl ethyl methyl phosphonium iodide was added to a 100 ml Rb flask in a glove box, and then brought out of the fume hood and dissolved in 70 ml MeOH. Next, $AgO_2CCF_2CF_2CF_3$ was added, immediately giving a yellow colored slurry. After stirring for 3 hours the solids were moved by filtration, the bulk MeOH removed by rotary evaporation and the remaining residue dried under high vacuum. This gave a yellow, gel-like slushy material. "Liquid" type crystals were observed forming on the sides of the Rb flask, when then "melted" away upon scraping of the flask. This experiment yielded 0.618 g of material. Thermogravimetric Analysis (TGA) was performed on the material and the results are shown in FIG. 7A. Evolved Gas Analysis (EGA) was also performed and the results are shown in FIG. 7B.

Example 4

Figure 8A:
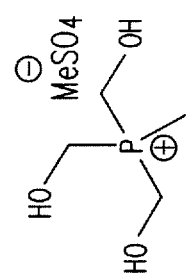
FIG. 8A depicts a reaction scheme.
Figure 8A:
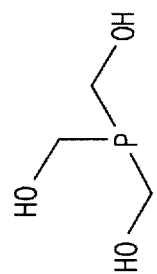
Figure 8B:
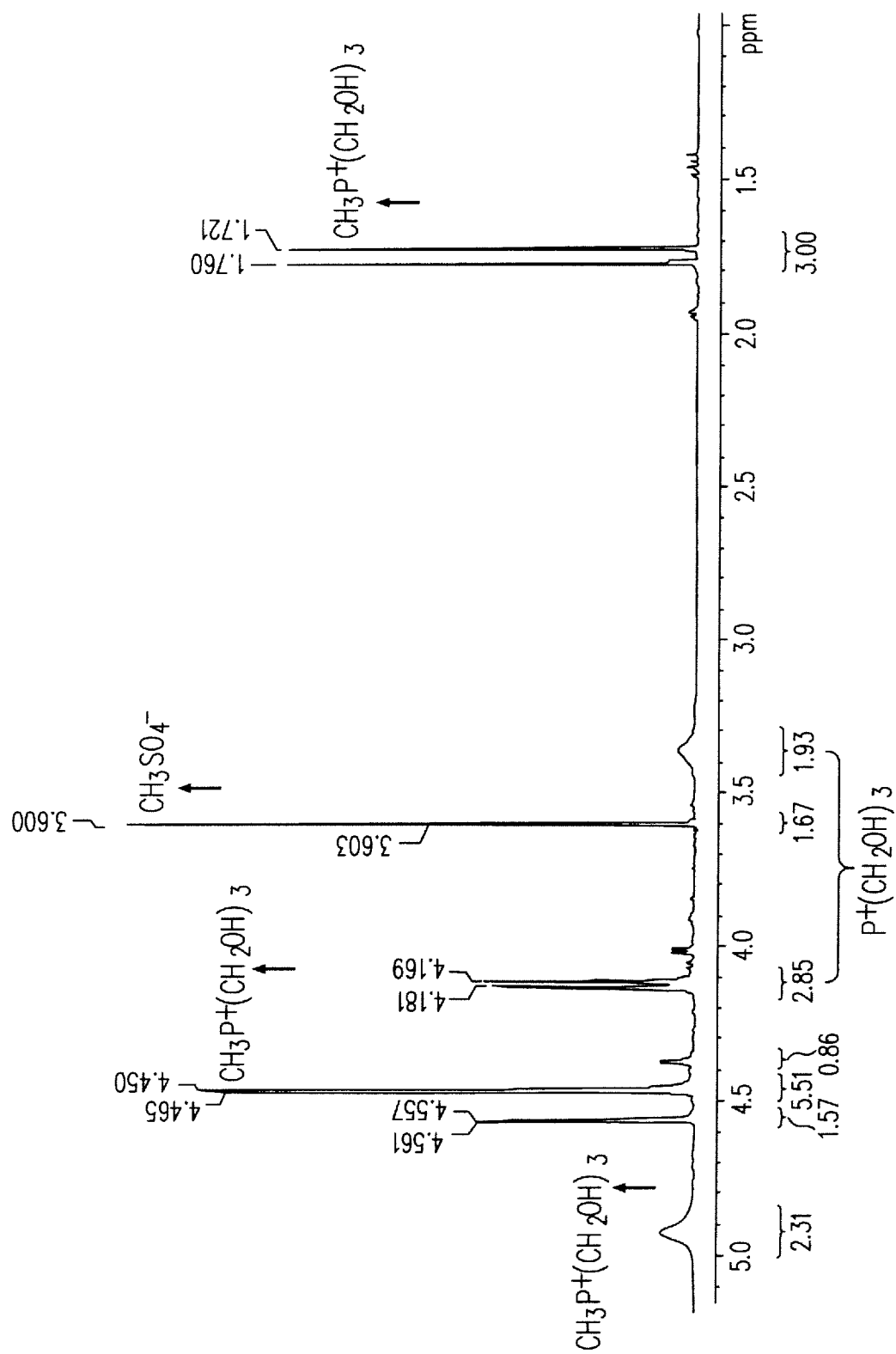
FIG. 8B shows the $^1$H NMR spectrum for exemplary embodiments of phosphonium ionic liquids prepared as described in FIG. 2 and Example 4.

A pressure flask was brought into the glovebox and charged with 0.100 g of $P(CH_2OH)_3$ followed by 5 mL of THF-d8. Once the solid was dissolved the $Me_2SO_4$ was added. The flask was then sealed and brought out of the glovebox. It was heated in a 110° C. oil bath for 10 minutes and then cooled, brought back into the glovebox, and a 1 mL aliquot removed for $^1H$ NMR. The reaction scheme is illustrated in FIG. 8A. The $^1H$ NMR spectrum is shown in FIG. 8B.

Example 5

Figure 9A:
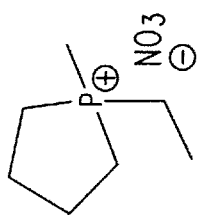
FIG. 9A is a reaction scheme.
Figure 9A:
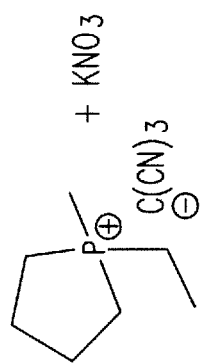
Figure 9B:
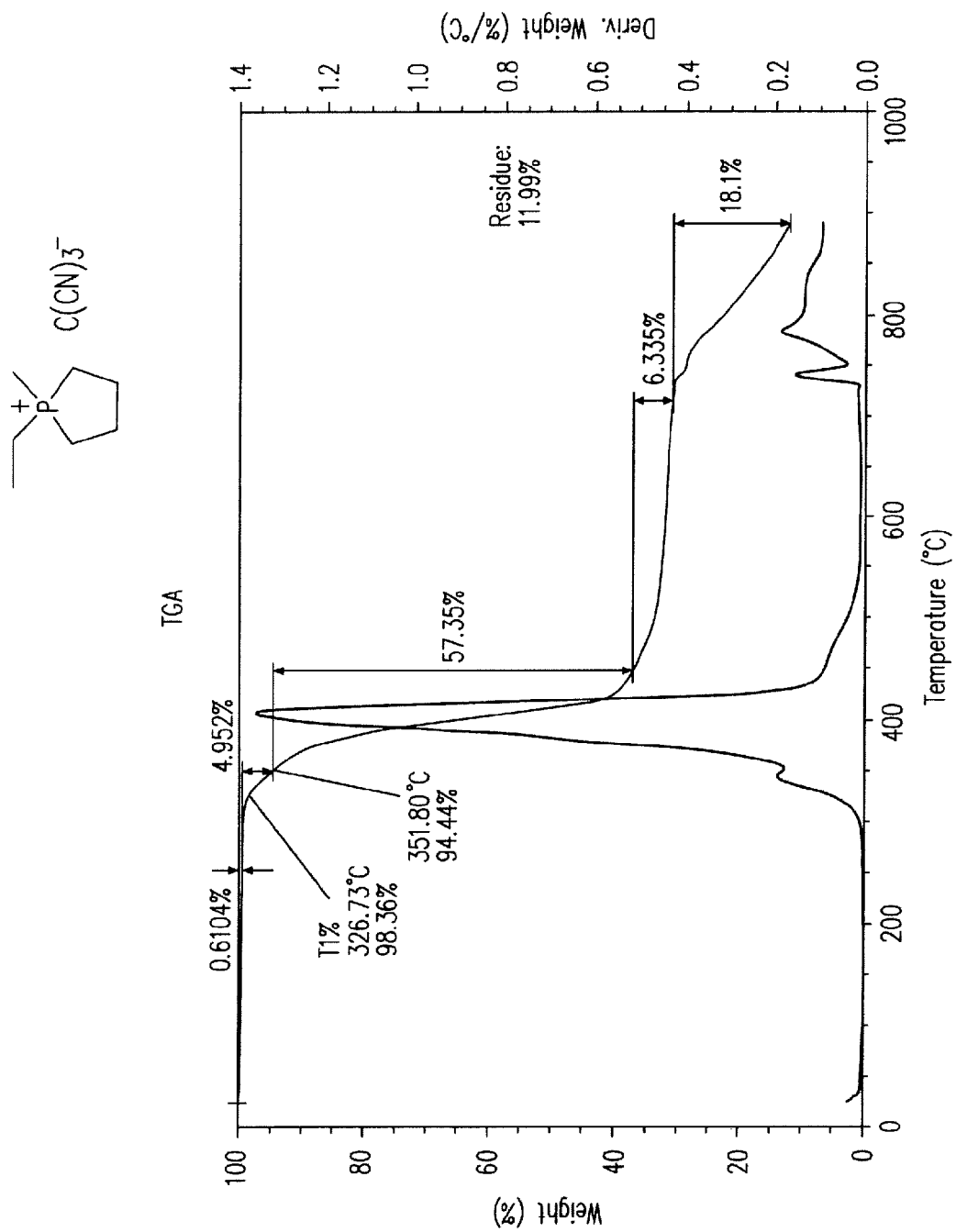
FIG. 9B is a graph showing thermogravimetric analysis (TGA) results for exemplary embodiments of phosphonium ionic liquids prepared according to Example 5.

In this experiment, 1-ethyl-1-methyl phospholanium nitrate was added to a 100 ml 14/20 Rb flask in a glove box. To this $KC(CN)_3$ was added and then the Rb was assembled to a 3 cm swivel frit. The frit was brought out to he line and $CHCl_3$ was vacuum transferred in. The flask was allowed to stir for 12 hours. A gooey brown material was observed on the bottom of the flask. The solution was filtered giving a pearly, opalescent filtrate from which brown oil separated out. The brown material was washed 2 times with recycled CHCl3 causing it to become whiter and more granular. All volatile components were removed under high vacuum, giving a low viscosity brown oil. This experiment yielded 1.52 g of material. The reaction scheme is shown in FIG. 9A. Thermogravimetric Analysis (TGA) was performed on the material and the results are shown in FIG. 9B.

Example 6

Figure 10:
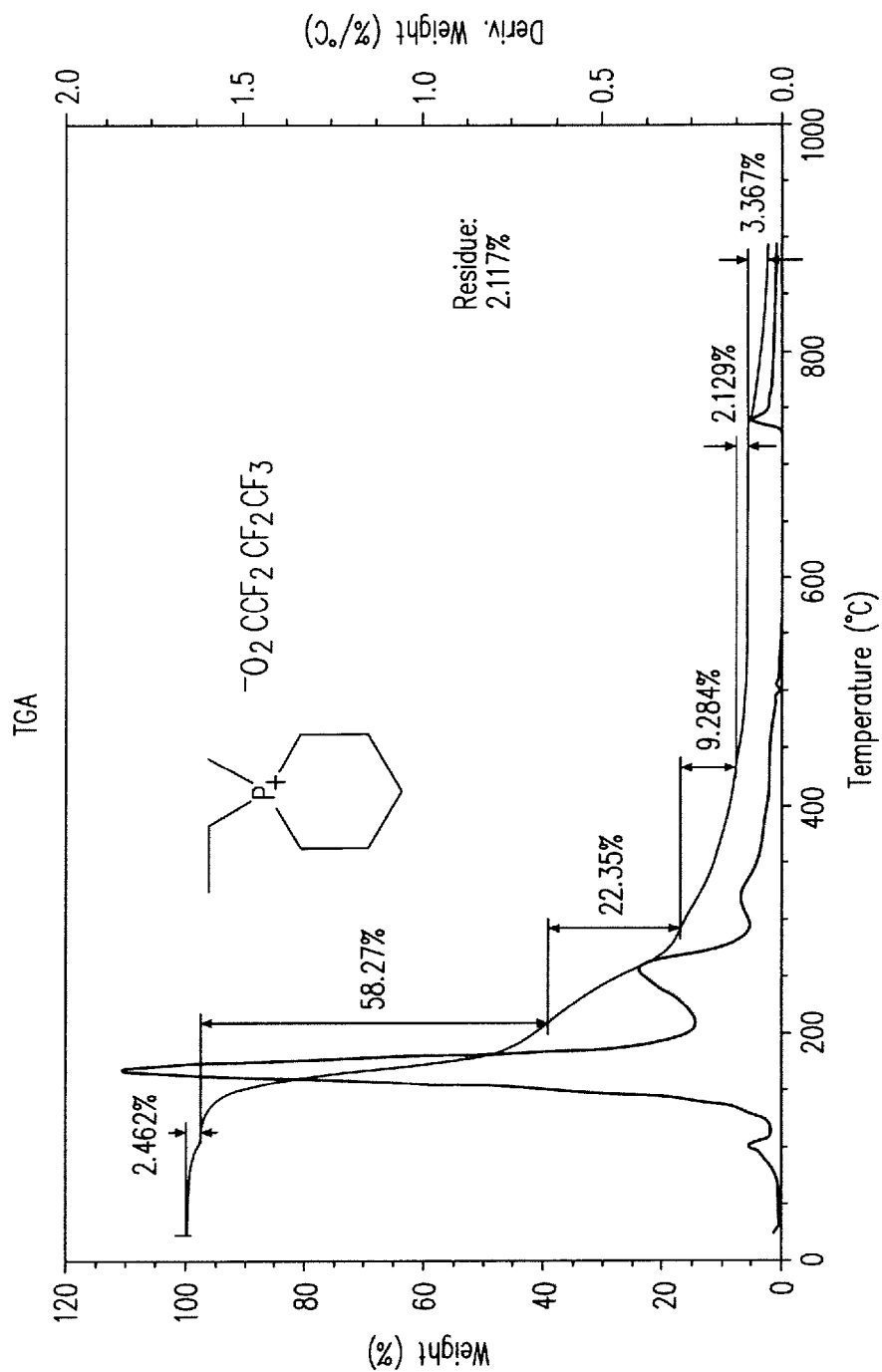
FIG. 10 is a graph showing thermogravimetric analysis (TGA) results for exemplary embodiments of phosphonium ionic liquids prepared according to Example 6.

In this experiment 1-ethyl-1-methyl phosphorinanium iodide was added to a 100 ml Rb flask in a glove box and then brought out to a fume hood where it was dissolved in 70 ml MeOH. Next, $AgO_2CCF_2CF_2CF_3$ was added, immediately giving a yellow precipitate. The flask was stirred for 18 hours and then the solids removed by filtration. Bulk MeOH was removed by rotary evaporation and the residual dried under high vacuum. This procedure gave an off-white, yellow-tinted solid. This experiment yielded 0.620 g of material. Thermogravimetric Analysis (TGA) was performed on the material and the results are shown in FIG. 10.

Example 7

In another experiment, 1-butyl-1-ethyl phospholanium iodide was added to a Rb flask in a fume hood, and then dissolved in water and stirred. AgO₃SCF₃ was added and a yellow precipitate formed immediately. The flask was stirred for 2 hours and then vacuum filtered. The solution foamed during filtration, and a milky substance was observed after filtration. The material was rotary evaporated and the residue dried under vacuum on an oil bath which melted the solid. This experiment yielded 0.490 g of material. Thermogravimetric Analysis (TGA) was performed on the material and the results are shown in FIG. 11.

Example 8

Figure 12A:
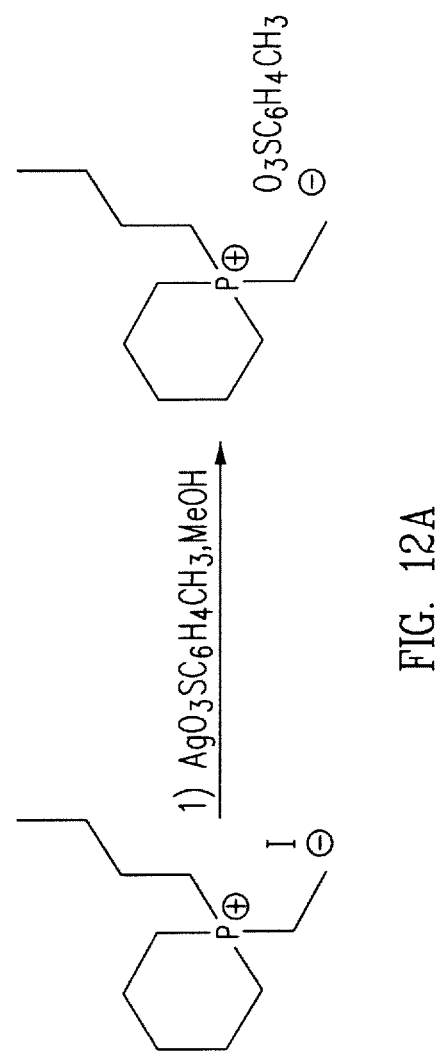
FIG. 12A depicts a reaction scheme.
Figure 12B:
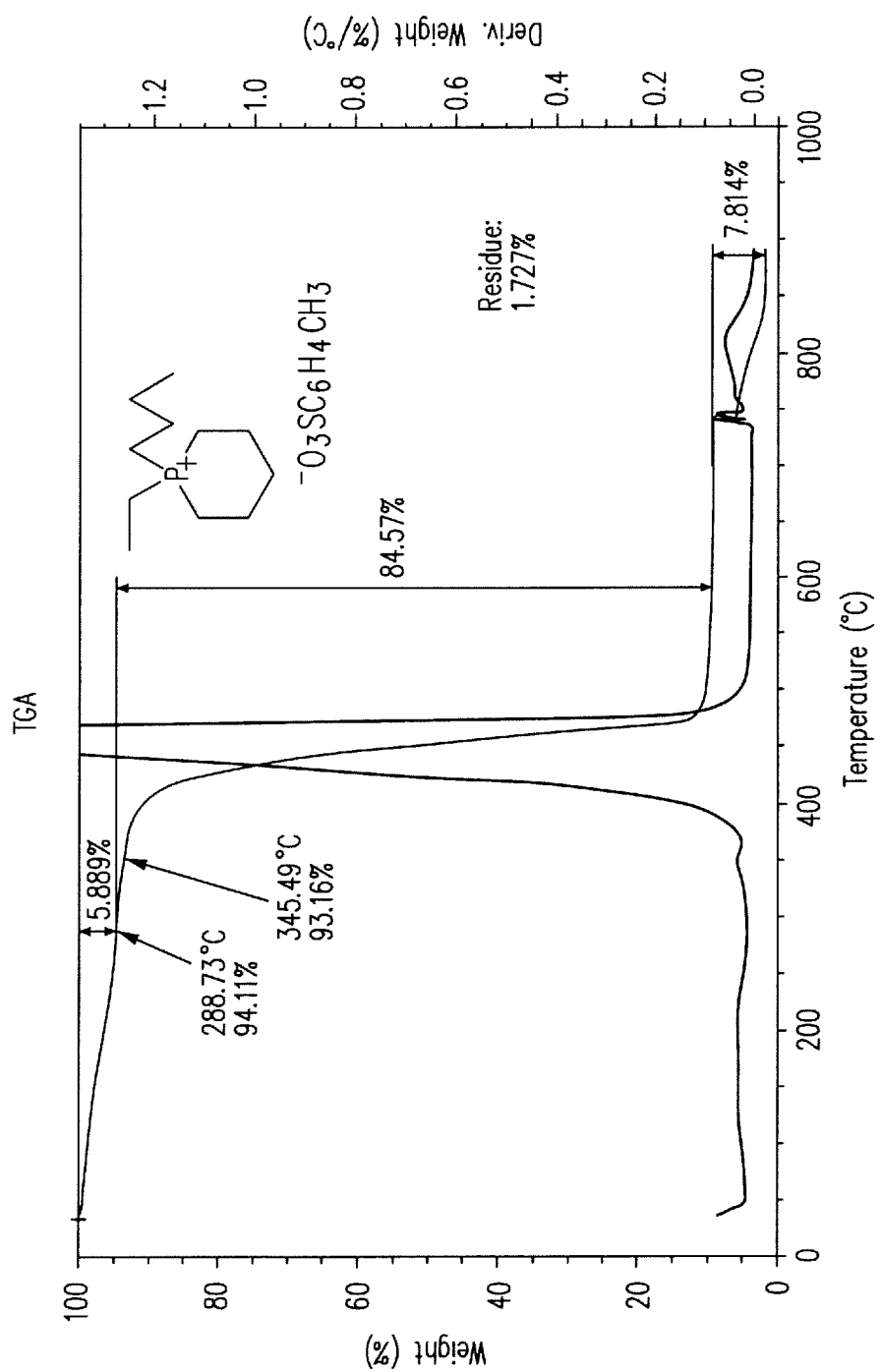
FIG. 12B is a graph showing thermogravimetric analysis (TGA) results for exemplary embodiments of phosphonium ionic liquids prepared according to Example 8.

In a further experiment, 1-butyl-1-ethyl phosphorinanium iodide was added to a flask in a fume hood. MeOH was added and then the flask was stirred for 15 minutes. Silver p-toluene sulfonate was added. The flask was stirred for 4 hours. A yellow precipitate formed. The material was gravity filtered and then rotary evaporated. The material was dried under vacuum, resulting in a liquid This experiment yielded 0.253 g of material. The reaction scheme is shown in FIG. 12A. Thermogravimetric Analysis (TGA) was performed on the material and the results are shown in FIG. 12B.

The present invention is not to be limited in scope by the specific embodiments disclosed in the examples which are intended as illustrations of a few aspects of the invention and any embodiments which are functionally equivalent are within the scope of this invention. Indeed, various modifications of the invention in addition to those shown and described herein will become apparent to those skilled in the art and are intended to fall within the appended claims.

A number of references have been cited, the entire disclosures of which are incorporated herein by reference.

What is claimed is:

1. An ionic liquid composition, comprising:
a phosphonium based cation of the formula:

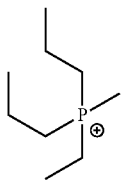

and;
one or more anions comprised of any one or more of the following: $^-O_3SCF_3$, $^-O_2CCF_3$, $^-O_2CCF_2CF_2CF_3$, $CF_3BF_3^-$, $C(CN)_3^-$, $PF_6^-$, $NO_3^-$, $^-O_3SCH_3$, $BF_4^-$, $^-O_3SCF_2CF_2CF_3$, $^-O_2CCF_2CF_3$, $^-O_2CH$, $^-O_2CC_6H_5$, $^-OCN$, $CO_3^{2-}$, or $^-N(CN)_2$.

2. An ionic liquid composition, comprising: one or more phosphonium based cations comprised of one or more of the following formulas:

| Cation | R1 | R2 | R3 | R4 |
|---|---|---|---|---|
| P⁺ | Methyl | Methyl | Methyl | Ethyl |
| P⁺ | Methyl | Methyl | Methyl | Propyl |
| P⁺ | Methyl | Methyl | Methyl | i-Propyl |
| P⁺ | Methyl | Methyl | Ethyl | Propyl |
| P⁺ | Methyl | Methyl | Ethyl | i-Propyl |
| P⁺ | Methyl | Ethyl | Ethyl | Propyl |
| P⁺ | Methyl | Ethyl | Ethyl | i-Propyl |
| P⁺ | Methyl | Ethyl | i-Propyl | i-Propyl |
| P⁺ | Ethyl | Ethyl | Propyl | i-Propyl |
| P⁺ | Ethyl | Ethyl | Ethyl | Propyl |
| P⁺ | Ethyl | Ethyl | Ethyl | i-Propyl |
| P⁺ | Propyl | Propyl | Propyl | Methyl |
| P⁺ | Propyl | Propyl | Propyl | Ethyl |
| P⁺ | Propyl | Propyl | Propyl | i-Propyl |
| P⁺ | i-Propyl | i-Propyl | i-Propyl | Methyl |
| P⁺ | i-Propyl | i-Propyl | i-Propyl | Ethyl |
| P⁺ | i-Propyl | i-Propyl | i-Propyl | Propyl. | and;
one or more anions, wherein the one or more anions are comprised of any one or more of the following: $^-O_3SCF_3$, $^-O_2CCF_3$, $^-O_2CCF_2CF_2CF_3$, $CF_3BF_3^-$, $C(CN)_3^-$, $PF_6^-$, $NO_3^-$, $^-O_3SCH_3$, $BF_4^-$, $^-O_3SCF_2CF_2CF_3$, $^-O_2CH$, $^-O_2CC_6H_5$, $^-OCN$, $CO_3^{2-}$, or $^-N(CN)_2$.

3. The ionic liquid composition of claim 2, wherein the ionic liquid composition exhibits thermodynamic stability up to a temperature of approximately 375° C., ionic conductivity up to 10 mS/cm at room temperature, and a liquidus range greater than 400° C.

4. The ionic liquid composition of claim 1 wherein one or more of the hydrogen atoms in one or more of the alkyl groups are substituted by fluorine.

5. The ionic liquid composition of claim 2 wherein one or more of the hydrogen atoms in one or more of the alkyl groups are substituted by fluorine.

6. An ionic liquid composition, comprising, a phosphonium based cation of the formula:

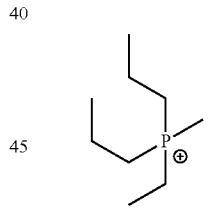

and
one or more anions comprised of any one of more of the following anion mixtures: $1NO_3^-/1O_3SCF_3$, $3NO_3^-/1O_3SCF_3$, $1NO_3^-/3O_3SCF_3$, $1NO_3^-/1N(SO_2CF_3)_2^-$, $1NO_3^-/1PF_6^-$, $1O_3SCF_3^-/1N(SO_2CF_3)_2^-$, $1O_3SCF_3^-/1O_3SC_6H_4CH_3^-$, $3O_3SCF_3^-/1O_3SC_6H_4CH_3^-$, $1O_3SCF_3^-/1O_3SCF_2CF_2CF_3^-$, $1O_3SC_6H_4CH_3^-/3O_3SCH_3^-$, $1O_3SC_6H_4CH_3^-/1O_3SCF_2CF_2CF_3^-$, $3O_3SC_6H_4CH_3^-/1O_3SCF_2CF_2CF_3^-$, or $1O_3SC_6H_4CH_3^-/3O_3SCF_2CF_2CF_3^-$.

* * * * *